(12) United States Patent
Liu et al.

(10) Patent No.: US 10,879,954 B2
(45) Date of Patent: Dec. 29, 2020

(54) LOGICAL CHANNEL HOPPING SEQUENCE DESIGN

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/173,945

(22) Filed: Oct. 29, 2018

(65) Prior Publication Data
US 2019/0149190 A1 May 16, 2019

Related U.S. Application Data

(60) Provisional application No. 62/586,120, filed on Nov. 14, 2017.

(51) Int. Cl.
*H04B 1/7143* (2011.01)
*H04B 1/7156* (2011.01)
(Continued)

(52) U.S. Cl.
CPC ......... *H04B 1/7143* (2013.01); *H04B 1/7156* (2013.01); *H04L 5/0012* (2013.01);
(Continued)

(58) Field of Classification Search
CPC ... H04B 1/7143; H04B 1/7156; H04L 5/0012; H04W 48/16; H04W 4/025; H04W 16/02; H04W 16/12
See application file for complete search history.

(56) References Cited

U.S. PATENT DOCUMENTS 6,363,099 B1 * 3/2002 Sakoda ............... H04B 1/7143
370/329
8,451,914 B2 5/2013 Li et al.
(Continued)

FOREIGN PATENT DOCUMENTS

EP         1520443 B1    10/2016
WO   WO-2007121387 A2   10/2007

OTHER PUBLICATIONS

International Search Report and Written Opinion—PCT/US2018/058447—ISA/EPO—dated Feb. 14, 2019 (180803WO).

*Primary Examiner* — Betsy Deppe
(74) *Attorney, Agent, or Firm* — Holland & Hart LLP

(57) ABSTRACT

Methods, systems, and devices for wireless communications are described. A transmitting device may identify synchronization signals and a set of frequency hopping channels for communications as part of a discovery reference signal (DRS) in an anchor channel. The set of frequency hopping channels may include a sequence to indicate an order for utilizing each hopping channel of the set of hopping channels. In some cases, the hopping sequence may be a pseudo random sequence. Additionally, the hopping sequence may be defined such that a non-repeating hopping sequence or pattern which visits all hopping frequencies before revisiting the same frequency is utilized. As such, each hopping channel may be utilized an equal number of times within a period of time and have an approximately equal occupancy time to the other hopping channels.

44 Claims, 16 Drawing Sheets

(51) Int. Cl.
*H04W 48/16* (2009.01)
*H04W 4/02* (2018.01)
*H04L 5/00* (2006.01)
H04B 1/7136 (2011.01)
H04W 72/04 (2009.01)

(52) U.S. Cl.
CPC ........... *H04W 4/025* (2013.01); *H04W 48/16* (2013.01); *H04B 2001/71367* (2013.01); *H04B 2001/71566* (2013.01); *H04L 5/0053* (2013.01); *H04L 5/0094* (2013.01); *H04W 72/0453* (2013.01)

(56) References Cited

U.S. PATENT DOCUMENTS

| | | | |
|---|---|---|---|
| 8,837,445 B2 * | 9/2014 | Jeong | H04L 12/40013 370/338 |
| 2006/0280142 A1 | 12/2006 | Damnjanovic et al. | |
| 2019/0045372 A1 * | 2/2019 | Niu | H04W 4/70 |
| 2019/0052308 A1 * | 2/2019 | Niu | H04B 1/7143 |

* cited by examiner

US 10,879,954 B2

LOGICAL CHANNEL HOPPING SEQUENCE DESIGN

CROSS REFERENCES

The present Application for Patent claims the benefit of U.S. Provisional Patent Application No. 62/586,120 by LIU, et al., entitled "LOGICAL CHANNEL HOPPING SEQUENCE DESIGN," filed Nov. 14, 2017, assigned to the assignee hereof, and expressly incorporated by reference herein.

BACKGROUND

The following relates generally to wireless communication, and more specifically to logical channel hopping sequence design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless systems may enable communication between a base station and a UE over different radio frequency spectrum bands (e.g., shared radio frequency spectrum bands, licensed radio frequency spectrum bands, unlicensed radio frequency spectrum bands, etc.). When initially performing cell acquisition, or when identifying one or more neighbor cells when connected with a serving cell, a UE may identify one or more discovery reference signal (DRS) transmissions from a base station, which may allow the UE to synchronize and communicate with the base station. In some cases, the DRS transmissions may further indicate a set of frequency hopping channels to facilitate coexistence with other devices and technologies occupying a same frequency spectrum band as the UE, which may prevent any particular transmitter from occupying the same frequency spectrum band for a disproportionate amount of time compared to other transmitters in the system. However, the transmitter may also utilize one frequency hopping channel from the set of frequency hopping channels longer than the other frequency hopping channels. Improved techniques for utilizing the set of frequency hopping channels is desired.

SUMMARY

The described techniques relate to improved methods, systems, devices, or apparatuses that support logical channel hopping sequence design. Generally, the described techniques provide for identifying an anchor channel and a set of physical hopping channels for data transmissions, mapping the physical hopping channels to a corresponding set of logical hopping channels, determining a hopping sequence such that every logical channel within the set of logical hopping channels is used an equal number of times within a period of time, and communicating data according to the hopping sequence. In some cases, the hopping sequence may be determined through a pseudo-random hopping sequence based on a location of a transmitting device (e.g., a physical cell identifier (PCI)) and a transmission time (e.g., a plurality of subframe numbers). Additionally or alternatively, each of the set of logical hopping channels may have a corresponding pseudo-random number associated with it, where the pseudo-random number may be determined by a pseudo-random number generator (e.g., a permutation function).

A method of wireless communication at a wireless device is described. The method may include identifying an anchor channel for transmission of a synchronization signal and a plurality of physical hopping channels for transmission of data, mapping the plurality of physical hopping channels to a corresponding plurality of logical hopping channels, determining a hopping sequence to be used for communication of data on the plurality of logical hopping channels such that every logical channel within the plurality of logical hopping channels is used an equal number of times within a period of time, and communicating data on the plurality of logical hopping channels in accordance with the hopping sequence.

An apparatus for wireless communication at a wireless device is described. The apparatus may include means for identifying an anchor channel for transmission of a synchronization signal and a plurality of physical hopping channels for transmission of data, means for mapping the plurality of physical hopping channels to a corresponding plurality of logical hopping channels, means for determining a hopping sequence to be used for communication of data on the plurality of logical hopping channels such that every logical channel within the plurality of logical hopping channels is used an equal number of times within a period of time, and means for communicating data on the plurality of logical hopping channels in accordance with the hopping sequence.

Another apparatus for wireless communication at a wireless device is described. The apparatus may include a processor, memory in electronic communication with the processor, and instructions stored in the memory. The instructions may be operable to cause the processor to identify an anchor channel for transmission of a synchronization signal and a plurality of physical hopping channels for transmission of data, map the plurality of physical hopping channels to a corresponding plurality of logical hopping channels, determine a hopping sequence to be used for communication of data on the plurality of logical hopping channels such that every logical channel within the plurality of logical hopping channels is used an equal number of times within a period of time, and communicate data on the plurality of logical hopping channels in accordance with the hopping sequence.

A non-transitory computer-readable medium for wireless communication at a wireless device is described. The non-transitory computer-readable medium may include instructions operable to cause a processor to identify an anchor channel for transmission of a synchronization signal and a plurality of physical hopping channels for transmission of data, map the plurality of physical hopping channels to a corresponding plurality of logical hopping channels, determine a hopping sequence to be used for communication of data on the plurality of logical hopping channels such that every logical channel within the plurality of logical hopping channels is used an equal number of times within a period of time, and communicate data on the plurality of logical hopping channels in accordance with the hopping sequence.

In some examples of the method, apparatus, and non-transitory computer-readable medium described above, determining the hopping sequence includes determining a pseudo-random hopping sequence based on a location of the transmitting device and a transmission time.

In some examples of the method, apparatus, and non-transitory computer-readable medium described above, determining the hopping sequence includes determining a pseudo-random hopping sequence based on a PCI associated with the transmitting device and a plurality of subframe numbers to be used for the communication of the data.

In some examples of the method, apparatus, and non-transitory computer-readable medium described above, determining the hopping sequence includes identifying a number of the plurality of logical hopping channels. Some examples of the method, apparatus, and non-transitory computer-readable medium described above may further include processes, features, means, or instructions for determining a modulo of a pseudo-random number with the number of the plurality of logical hopping channels.

Some examples of the method, apparatus, and non-transitory computer-readable medium described above may further include processes, features, means, or instructions for determining the pseudo-random number using a pseudo-random number generator whose inputs include portions of bit representations of a PCI associated with the transmitting device and a plurality of subframe numbers to be used for the communication of the data identifying a number of the plurality of logical hopping channels.

In some examples of the method, apparatus, and non-transitory computer-readable medium described above, most significant bits of the PCI and least significant bits of the plurality of subframe numbers may be used in determining the pseudo-random number.

Some examples of the method, apparatus, and non-transitory computer-readable medium described above may further include processes, features, means, or instructions for determining the pseudo-random number using a permutation function.

In some examples of the method, apparatuses, and non-transitory computer-readable medium described herein, the permutation function includes a permutation five function.

In some examples of the method, apparatus, and non-transitory computer-readable medium described above, the synchronization signal includes at least one of a primary synchronization signal (PSS), a second synchronization signal (SSS), a physical broadcast channel (PBCH), a system information block (SIB), or combinations of the same.

In some examples of the method, apparatus, and non-transitory computer-readable medium described above, the communication of data may be over an unlicensed spectrum.

In some examples of the method, apparatuses, and non-transitory computer-readable medium described herein, the wireless device may be a user equipment (UE) and may include operations, features, means, or instructions for receiving, from a base station, one or more downlink transmissions on the set of hopping channels in accordance with the hopping sequence, and transmitting, to the base station, one or more uplink transmissions on the set of hopping channels in accordance with the hopping sequence.

In some examples of the method, apparatuses, and non-transitory computer-readable medium described herein, the wireless device may be a base station and may include operations, features, means, or instructions for transmitting, to a UE, one or more downlink transmissions on the set of hopping channels in accordance with the hopping sequence, and receiving, from the UE, one or more uplink transmissions on the set of hopping channels in accordance with the hopping sequence.

DETAILED DESCRIPTION

Figure 1:
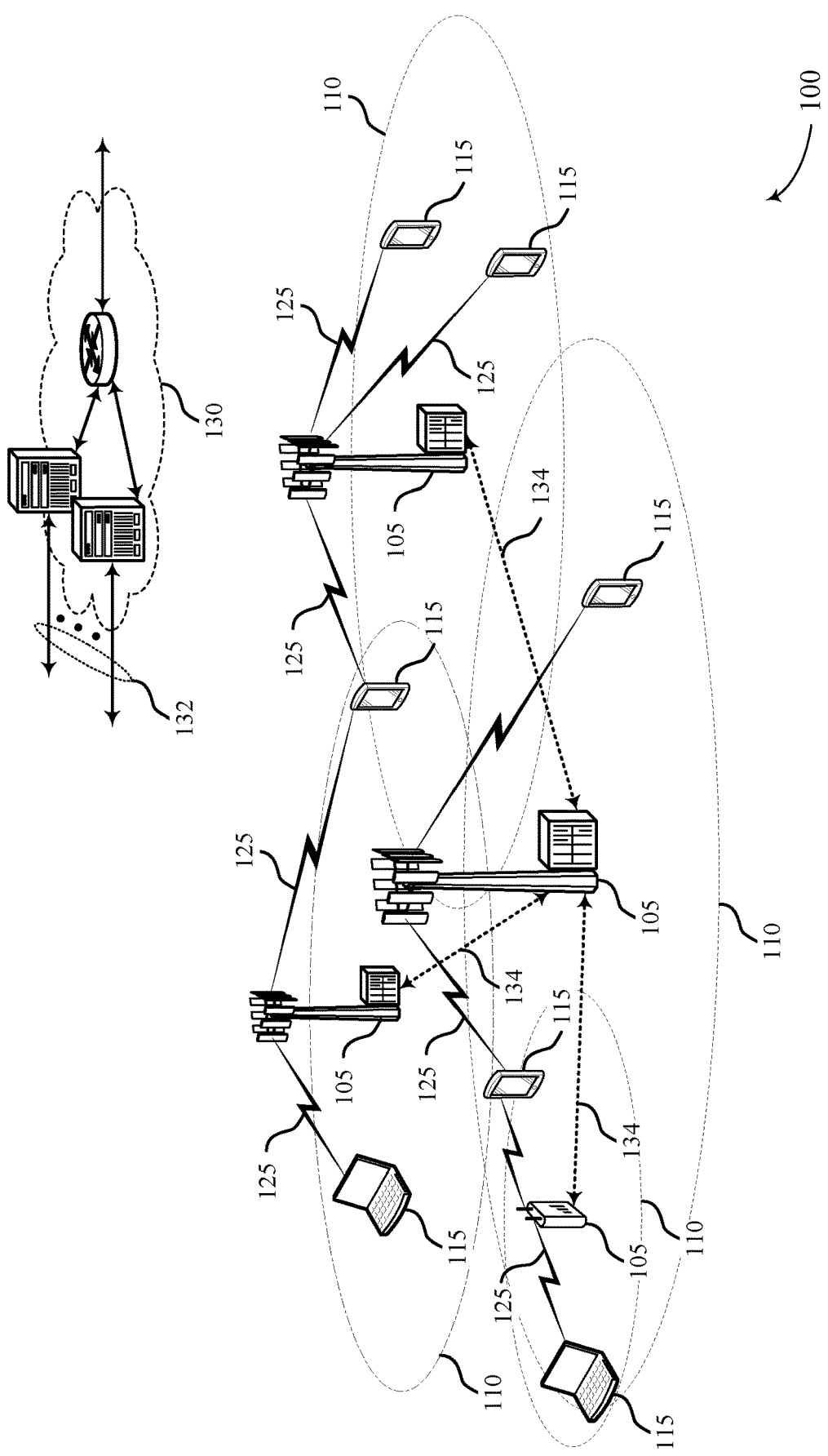
FIG. 1 illustrates an example of a system for wireless communication that supports logical channel hopping sequence design in accordance with aspects of the present disclosure.

The described techniques relate to improved methods, systems, devices, or apparatuses that support a frequency hopping channel sequence in a radio frequency spectrum such as an unlicensed, shared, or licensed frequency spectrum. Generally, the described techniques provide for defining a logical channel hopping sequence design (e.g., frequency hopping channel sequence) such that each frequency hopping channel of a set of frequency hopping channels is utilized for an approximately equal amount of time within a given timeframe.

A wireless device may perform initial system acquisition prior to engaging in communications within wireless systems utilizing unlicensed radio frequency spectrum. For example, a wireless device may perform an initial system acquisition by acquiring one or more synchronization signals, determining a system timing and synchronization information, etc. Accordingly, once a user equipment (UE) has the synchronization information (e.g., slot and subframe synchronization associated with a base station), the UE may communicate with the base station. In some cases, the base station and UE may communicate in an enhanced machine-type-communication (eMTC) wireless system that operates in a 2.4 GHz shared frequency spectrum band. Additionally or alternatively, the base station and UE may operate in a narrowband Internet-of-things (NB-IoT) deployment in a sub 1 GHz shared radio frequency spectrum band.

In some wireless communications systems (e.g., eMTC or NB-IoT), a base station may transmit synchronization signals as part of a discovery reference signal (DRS) in a predefined anchor channel to enable faster acquisition in an unlicensed frequency spectrum for the wireless communications system (e.g., unlicensed frequency spectrum for eMTC (eMTC-u) or NB-IoT (NB-IoT-u)). A UE may monitor the predefined anchor channel to identify and receive the DRS to enable synchronization and acquisition. The DRS may additionally indicate a set of frequency hopping channels for communications between the base station and UE. When using a shared radio frequency spectrum (e.g., eMTC-u or NB-IoT-u), limits may be placed on transmitting wireless devices (e.g., UEs and base stations) to prevent any particular transmitter from occupying the spectrum for a disproportionate amount of time. As such, frequency hopping techniques may be employed, for example, to facilitate coexistence with other devices and technologies occupying the spectrum, resulting in reduced channel occupancy time.

The base station may choose a set of hopping channels (e.g., 16 or 32 channels for eMTC-u) from a list of available channels for frequency hopping. The set of hopping channels may further include a sequence to indicate an order for utilizing each hopping channel of the set of hopping channels. In some cases, the hopping sequence may be a pseudo random sequence. Additionally, the hopping sequence may be defined such that the average time of occupancy on any channel shall not be greater than a threshold (e.g., 0.4 seconds) within a period equal to the value of the threshold multiplied by the number of hopping channels employed (e.g., 0.4 seconds multiplied the number of hopping channels in the set of hopping channels). In order to assure that the average time of occupancy for each channel is below the threshold, the base station may define a non-repeating hopping sequence or pattern which visits each hopping frequency of the set of hopping frequencies before revisiting the same frequency. As such, each hopping channel may be utilized an equal number of times within a period of time and have an approximately equal total occupancy time to the other hopping channels.

Aspects of the disclosure are initially described in the context of wireless communications systems. Additionally, a frequency hopping scheme and a frequency hopping function, including a permutation function, are provided to describe aspects of the disclosure. Aspects of the disclosure are further illustrated by and described with reference to a process flow, apparatus diagrams, system diagrams, and flowcharts that relate to logical channel hopping sequence design.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCI), a virtual cell identifier (VCID)) operating via the same or a different carrier. In some examples, a carrier may support multiple cells, and different cells may be configured according to different protocol types (e.g., machine-type-communication (MTC), NB-IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP)

layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization and may provide a cell identity value, which may be combined with the physical layer identity value to identify the cell. The SSS may also enable detection of a duplexing mode and a cyclic prefix length. Some systems, such as TDD systems, may transmit a PSS but not an SSS, or vice versa. Both the PSS and the SSS may be located in central subcarriers (e.g., 62 and 72 subcarriers) of a carrier, respectively. In some cases, a UE 115 may acquire the synchronization signals by performing a correlation that includes combining a series of cumulative, coherent sub-correlations, where the sub-correlations may involve a comparison between the signal received during each interval and the predefined repeated sequences in the synchronization signal.

After completing initial cell synchronization, the UE 115 may receive a master information block (MIB) and may decode the MIB. The MIB may contain system bandwidth information, an SFN, and a physical hybrid automatic repeat request (HARD) indicator channel (PHICH) configuration. The MIB may be transmitted on physical broadcast channel (PBCH) and may utilize the first 4 orthogonal frequency division multiple access (OFDMA) symbols of the second slot of the first subframe of each radio frame. It may use the middle 6 resource blocks (72 subcarriers) in the frequency domain. The MIB carries a few important pieces of information for UE initial access, including downlink channel bandwidth in term of resource blocks, PHICH configuration (duration and resource assignment), and SFN. A new MIB may be broadcast every fourth radio frame (SFN mod 4=0) and rebroadcast every frame (10 ms). Each repetition is scrambled with a different scrambling code. After reading a MIB (either a new version or a copy), the UE 115 may try different phases of a scrambling code until it gets a successful cyclic redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase.

After decoding the MIB, the UE 115 may receive one or more system information block (SIBs). For example, a first SIB (SIB1) may contain cell access parameters and scheduling information for other SIBs. Decoding the SIB1 may enable the UE 115 to receive a second SIB (SIB2). The SIB2 may contain RRC configuration information related to random access channel (RACH) procedures, paging, physical uplink control channel (PUCCH), physical uplink shared channel (PUSCH), power control, SRS, and cell barring. The UE 115 may thus decode the SIB1 and SIB2 prior to accessing the network. Different SIBs may be defined according to the type of system information conveyed. A new SIB1 may be transmitted in the fifth subframe of every eighth frame (SFN mod 8=0) and rebroadcast every other frame (20 ms). Additionally, the SIB1 includes access information, including cell identity information, and it may indicate whether a UE is allowed to camp on a cell of a base station 105. The SIB1 also includes cell selection information (or cell selection parameters). Additionally, the SIB1 includes scheduling information for other SIBs. The SIB2 may be scheduled dynamically according to information in the SIB1 and includes access information and parameters related to common and shared channels. The periodicity of the SIB2 may be set to 8, 16, 32, 64, 128, 256 or 512 radio frames.

After the UE 115 decodes a SIB2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that may provide an uplink resource grant, a timing advance, and a temporary cell radio network temporary identity (C-RNTI). The UE 115 may then transmit an RRC connection request, or RACH message 3, along with a temporary mobile subscriber identity (TMSI) (e.g., if the UE 115 has previously been connected to the same wireless network) or a random identifier after receiving the RAR. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), it may repeat the RACH process by transmitting a new RACH preamble.

In some wireless communications systems, a base station 105 may include the PSS, SSS, PBCH, a reduced SIB, or a combination thereof, within a DRS on an anchor channel. A UE 115 may monitor the anchor channel to identify or receive the synchronization signals within the DRS. Additionally, the DRS may include physical locations of a set of frequency hopping channels and a frequency hopping channel sequence in the reduced SIB for the UE 115 to utilize for coexistence with other devices and technologies occupying a same frequency spectrum as the UE 115 and for reduced channel occupancy times. In some cases, the frequency hopping channel sequence may be defined such that the average time of occupancy on any channel shall not be greater than a threshold (e.g., 0.4 seconds) within a period equal to the value of the threshold multiplied by the number of hopping channels employed in the set of hopping channels.

Wireless communications system 100 may support efficient techniques for defining a frequency hopping channel sequence (e.g., logical channel hopping sequence design) such that each frequency hopping channel is used an equal number of times within a period of time. As such, a transmitting device (e.g., a UE 115) may visit each frequency hopping channel of the set of frequency hopping channels before revisiting the same frequency hopping channel, and each frequency hopping channel may have an approximately equal occupancy time on the frequency spectrum below the threshold as the other frequency hopping channels.

Figure 2:
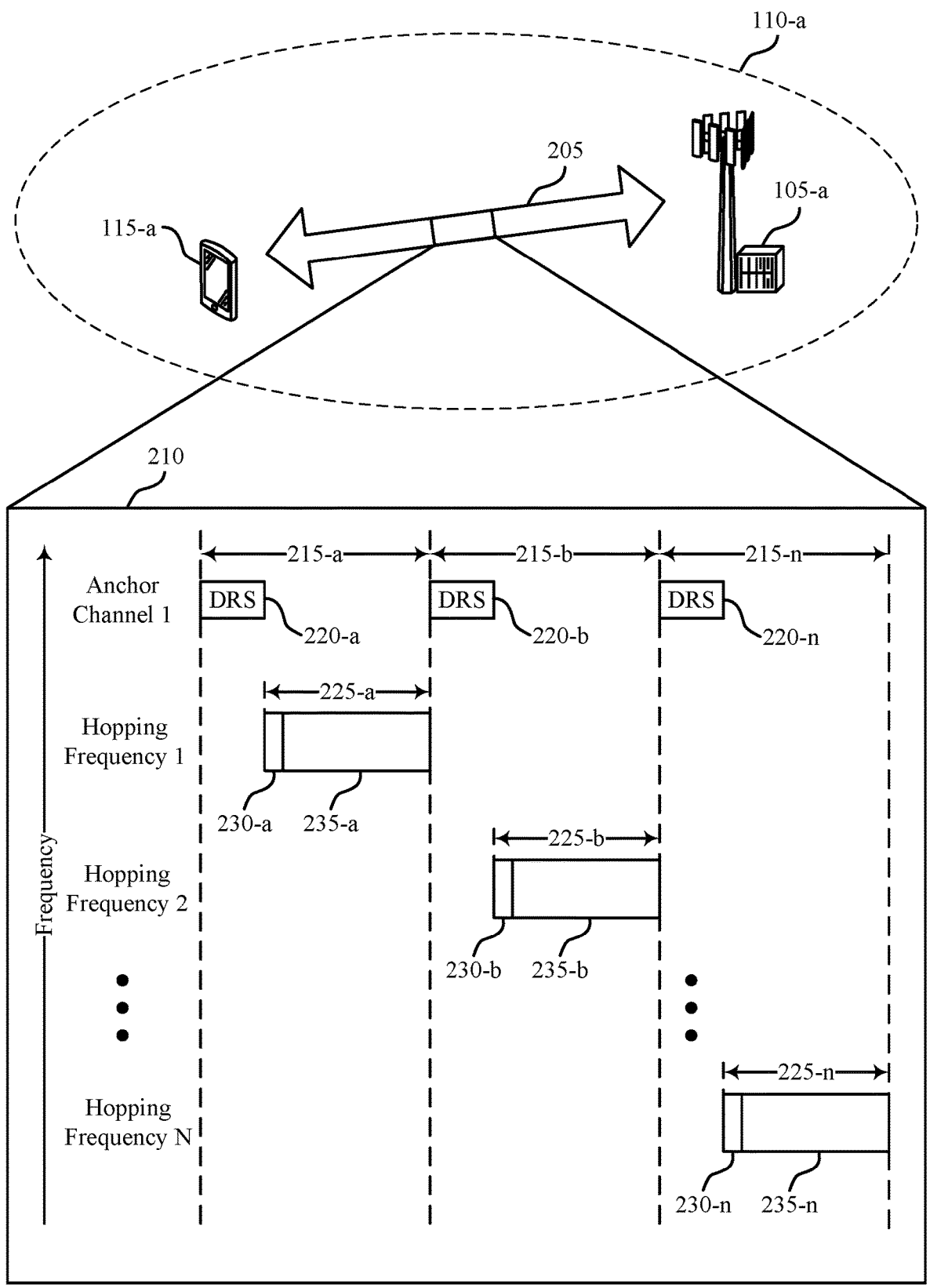
FIG. 2 illustrates an example of a wireless communications system and frequency hopping scheme that supports logical channel hopping sequence design in accordance with aspects of the present disclosure.

FIG. 2 illustrates an example of a wireless communications system 200 that supports logical channel hopping sequence design in accordance with various aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described with reference to FIG. 1. Base station 105-*a* and UE 115-*a* may communicate on resources of a carrier 205.

In some cases, base station 105-*a* and UE 115-*a* may communicate according to a frequency hopping scheme 210 on the resources of carrier 205. Frequency hopping scheme 210 may include an anchor channel, a number of hopping frequencies (e.g., frequency hopping channels), and a number of m-frames 215. In some cases, base station 105-*a* may indicate an N number of m-frames 215 (e.g., up to m-frame 215-*n*) for frequency hopping scheme 210, where each m-frame 215 lasts for a set amount of time. For example, each m-frame 215 may persist for 80 ms (e.g., in an eMTC-u frequency spectrum). Each m-frame 215 may include a DRS 220 and a data segment 225, where the DRS 220 in each m-frame 215 lasts for 5 ms and the data segment 225 in each m-frame 215 lasts for 75 ms. In some cases, each DRS 220 may be transmitted on an anchor channel 1 and each data segment 225 may be transmitted on a respective hopping frequency. For example, base station 105-*a* may transmit a DRS 220-*a* on the anchor channel 1 and then transmit a data segment 225-*a* on the hopping frequency 1. DRS 220-*a* may include synchronization signals (e.g., PSS, SSS, and PBCH) and locations for a set of hopping frequencies (e.g., in a reduced SIB), including a hopping sequence to indicate an order for using the set of hopping frequencies. Additionally, data segment 225-*a* may include a connection portion 230-*a* and a data portion 235-*a*, where base station 105-*a* performs an LBT procedure to determine if the spectrum is available for subsequent communications and UE 115-*a* transmits a RACH preamble during connection portion 230-*a* before UE 115-*a* transmits uplink data or receives downlink data (e.g., communicating with base station 105-*a*) during data portion 235-*a*.

After m-frame 215-*a*, UE 115-*a* may return to monitor the anchor channel 1 and base station 105-*a* may transmit additional synchronization signals, hopping frequency locations, and sequencing information in DRS 220-*b* during m-frame 215-*b*. Alternatively, base station 105-*b* may include the synchronization and hopping frequency information in DRS 220-*a* and may not transmit any signaling during DRS 220-*b*. DRS 220-*a*, DRS 220-*b*, or both may include a location for data segment 225-*b*. Additionally, the location may be a hopping frequency 2 different from the hopping frequency 1. As described above, data segment 225-*b* may include both a connection portion 230-*b* and a data portion 235-*b*. In some cases, UE 115-*a* may return to the anchor channel 1 to monitor for a DRS 220 after each m-frame 215 up to an n-th m-frame 215 (e.g., m-frame 215-*n*), which may include a DRS 220-*n* on the anchor channel 1 and a data segment 225-*n* on a hopping frequency N with a corresponding connection portion 230-*n* and a data portion 235-*n*. Alternatively, UE 115-*a* may revisit the anchor channel 1 every K non-anchor hops (e.g., moving between K-different hopping frequencies without returning to the anchor channel 1) to reduce synchronization delay. Additionally, the K non-anchor hops may be defined such that UE 115-*a* may visit a higher number of hopping frequencies before revisiting the anchor channel 1. For example, the number of hopping frequencies (e.g., hopping channels) may be large and an equal occupancy time may be desired for each of the hopping frequencies in a time period prior to revisiting the anchor channel 1. The K non-anchor hops may be defined in order to ensure each hopping frequency is visited and has an equal occupancy before UE 115-*a* revisits the anchor channel 1.

In some cases, base station 105-*a* may choose N hopping frequencies (i.e., up to a hopping frequency N) or frequency hopping channels from a list of available hopping frequencies (e.g., white-list). For example, in some wireless communication frequency spectrums (e.g., eMTC-u), base station 105-*a* may choose 16 or 32 channels from a list of 60 available channels. Each hopping frequency may have an equal channel size according to a shared radio frequency spectrum utilized. For example, each hopping frequency may be a 1.4 MHz band (e.g., for eMTC-u) or 1 resource block sized band (e.g., for NB-IoT-u).

Base station 105-*a* may signal the chosen channels to UE 115-*a* in each DRS 220 of each m-frame 215 or in the first DRS 220-*a* in m-frame 215-*a*. The chosen hopping channels may be mapped to logical hopping channels numbered from 0 to N−1, such that each hopping channel is used once in the logical hopping channels. Additionally, the logical hopping channels may indicate a sequence for utilizing the hopping channels. For example, as depicted in FIG. 2, the hopping frequency 1 may be utilized first and indicated by logical hopping channel 0, the hopping frequency 2 may be utilized second and indicated by logical hopping channel 1, and the hopping frequency N may be utilized last and indicated by logical hopping channel N−1. It is to be understood that the order of the hopping channels and logical hopping channel mapping may differ. For example, the hopping frequency 1 may be utilized at a different time than first with a corresponding logical hopping channel number, the hopping frequency 2 may be utilized at a different time than second with a corresponding logical hopping channel number, etc.

In some cases, the hopping sequence indicated by the logical hopping channel mapping may be a pseudo random sequence. Additionally, the average time of occupancy on any channel may be less than a threshold (e.g., 0.4 s) within a period of time corresponding to the value of the threshold multiplied by the number of hopping channels utilized. Accordingly, the hopping sequence may be defined such that UE 115-a visits all hopping frequencies at least once before revisiting the same frequency. For example, when 32 hopping frequencies and 32 m-frames are utilized, UE 115-a may visit each hopping frequency once. Alternatively, when 16 hopping frequencies and 32 m-frames are utilized, UE 115-a may visit each hopping sequence twice. Therefore, each hopping frequency is used an equal amount of times within a period of time. Additionally, the hopping sequence may vary for different PCIs and in time. For example, different UEs 115 may have different hopping sequences depending on their associated PCI to reduce possible collisions.

Figure 3:
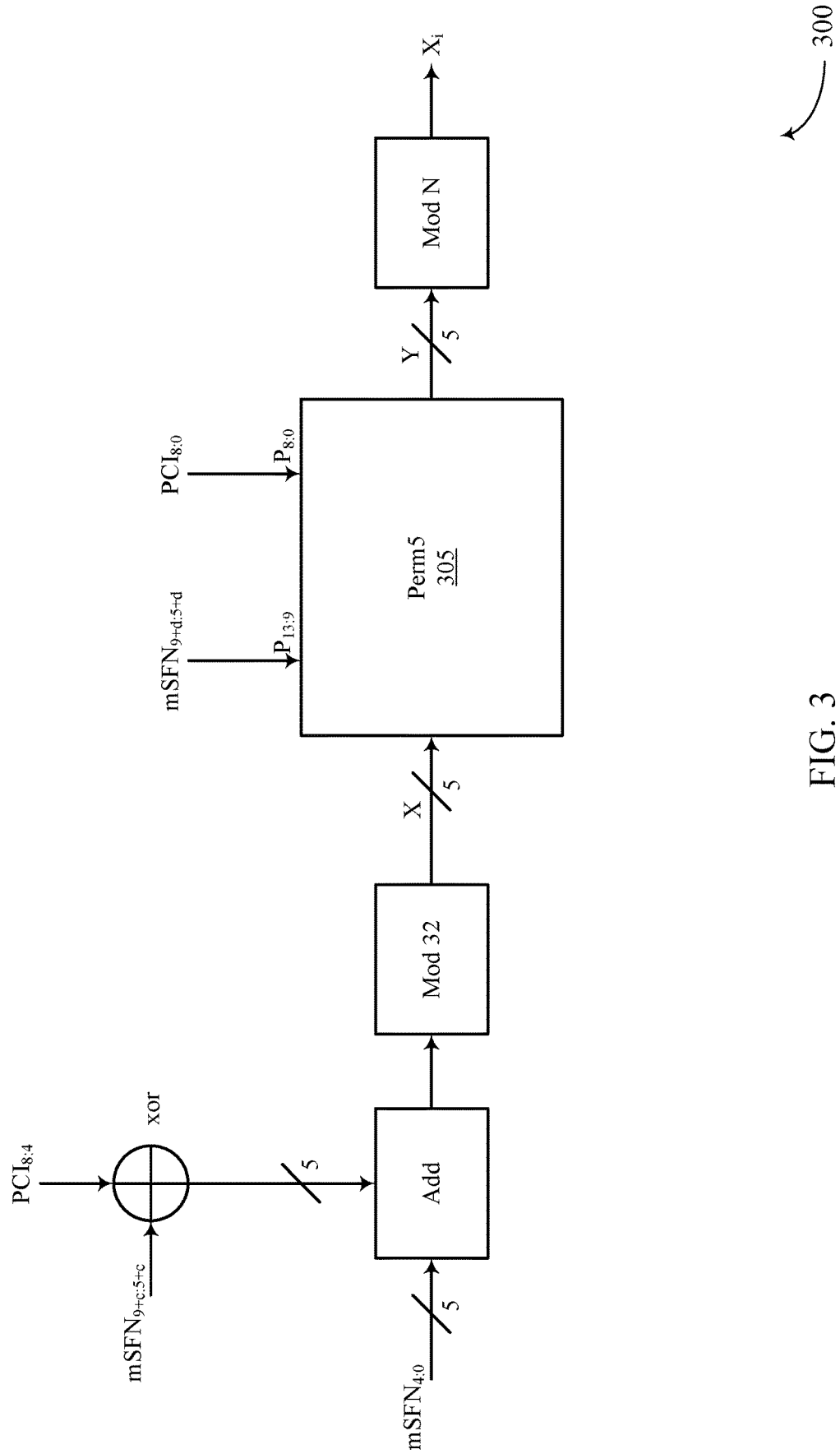
FIG. 3 illustrates an example of a frequency hopping function that supports logical channel hopping sequence design in accordance with aspects of the present disclosure.

FIG. 3 illustrates an example of a frequency hopping function 300 that supports logical channel hopping sequence design in accordance with various aspects of the present disclosure. In some examples, frequency hopping function 300 may implement aspects of wireless communications systems 100 and 200. A base station 105 may map each physical hopping frequency to a logical channel index, as described with reference to FIG. 2. Frequency hopping function 300 may be defined such that a pseudo-random hopping sequence is produced which visits each logical channel from all of the logical channels (e.g., hopping frequencies or frequency hopping channels) at least once before revisiting the same logical channel (e.g., hopping frequency or frequency hopping channel) in a certain order (e.g., each hopping frequency is visited once for 32 defined hopping frequencies and 32 defined m-frames or each hopping frequency is visited twice for 16 defined hopping frequencies and 32 defined m-frames).

The base station 105 may define a K-bit m-frame index for each hopping frequency, where a logical channel index for a hopping frequency is a function of the number of m-frames indicated (i.e., mSFN) and a PCI, where K≥10. K may correspond to a number of non-anchor hops as described above. A logical channel index for each hopping frequency may be defined such that $$X_i = Y \bmod N$$

where $X_i$ indicates the logical channel index number, Y indicates an output of a permutation function (e.g., Perm5 305), and N indicates the number of hopping frequencies (e.g., number of logical hopping channels). In some cases, N=16 or 32 (e.g., in eMTC-u spectrums). Y may be further defined as $$Y = \text{Perm5}(((m\text{SFN}_{4:0} + (\text{PCI}_{8:4} \text{ xor } m\text{SFN}_{0+c:5+c})) \bmod 32), (512 \times m\text{SFN}_{9+d:5+d} + \text{PCI}_{8:0}))$$

where the Perm5 function (e.g., Perm5 305) may generate a random number based on inputs to assign the random number as a logical channel index number to each hopping frequency.

As shown, a 5-bit m-frame number (e.g., mSFN4:0) may be added to the xor product of a PCI (e.g., a location as indicated by PCI8:4) and a portion of the most significant bits (MSBs) of the m-frames subframes numbers (e.g., mSFN9+c:5+c). That sum may then go through a modulo operation with a modulus of 32 (e.g., Mod 32). The output of the modulo operation may be the input for a permutation function (e.g., Perm5 305). The input is permuted (e.g., arranged into the sequence or order of hopping frequencies to visit) depending on MSBs of the PCI (e.g., PCI8:0) and least significant bits of the m-frames subframes numbers (e.g., mSFN9+d:5+d). The permuted value may then go through a second modulo operation with a modulus that has a value corresponding to the number of hopping frequencies (e.g., Mod N). The output of the second modulo operation may correspond to a logical channel index number for a hopping frequency (e.g., Xi). After each hopping frequency has a corresponding logical channel index number, the hopping frequencies may be randomly assigned in a hopping sequence.

Figure 4:
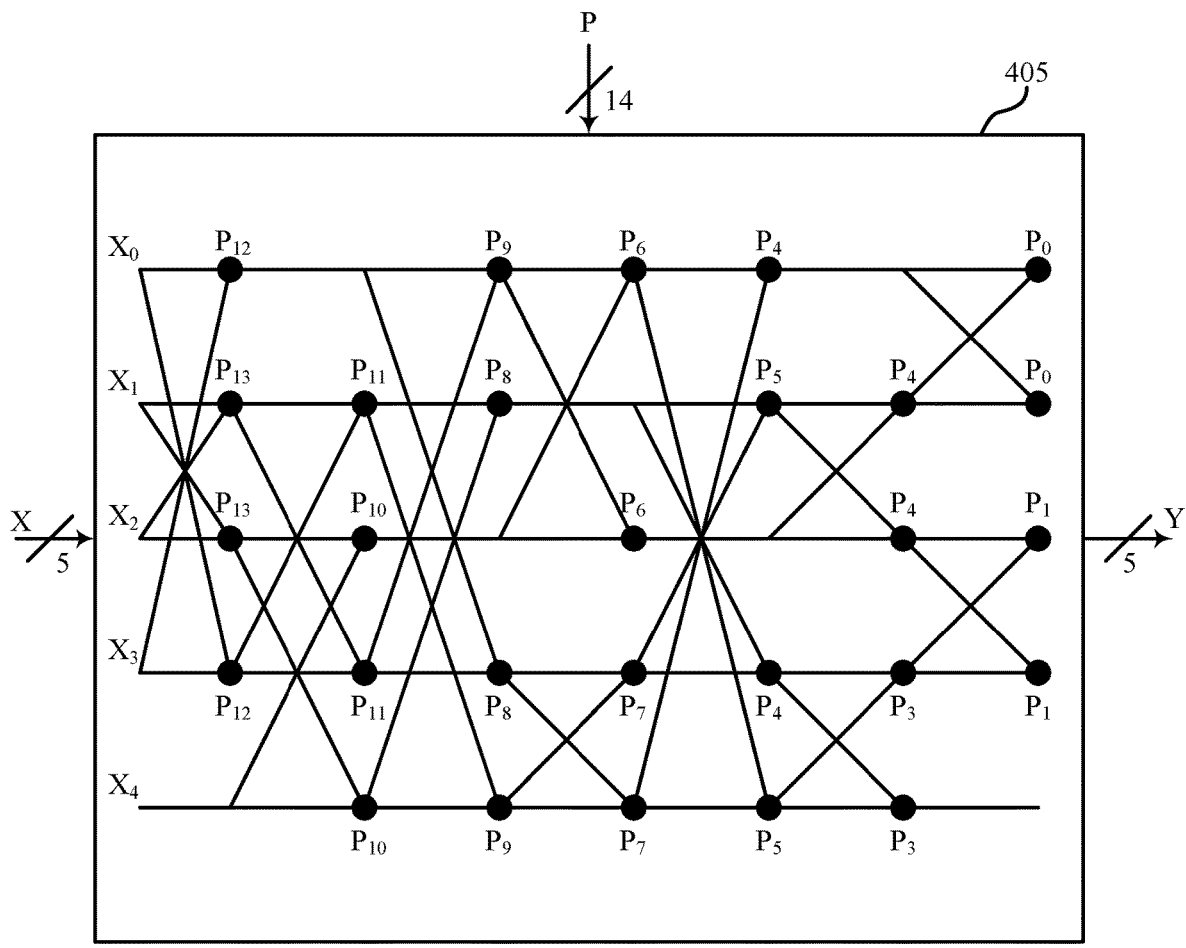
FIG. 4 illustrates an example of a permutation function that supports logical channel hopping sequence design in accordance with aspects of the present disclosure.

FIG. 4 illustrates an example of a permutation function 400 that supports logical channel hopping sequence design in accordance with various aspects of the present disclosure. In some examples, permutation function 400 may implement aspects of wireless communications systems 100 and 200. Permutation function 400 may illustrate a Perm5 405 function, which may be an example of the Perm5 305 function as described and shown in FIG. 3.

The input, X, to Perm5 405 may be defined as $$(m\text{SFN}_{4:0} + (\text{PCI}_{8:4} \text{ xor } m\text{SFN}_{9+c:5+c})) \bmod 32$$

where c≥0. In some cases, the input may depend on the mSFN index in faster time scale. Additionally, the input may be offset by the PCI (e.g., different cells have different starting hopping frequencies) and by the MSBs of mSFN (e.g., different starting hopping frequencies in the time scale of 32×mSFN). Perm5 405 then permutes the input bits, X, depending on PCI and mSFN (i.e., a 14-bit control signal, P). The control signal, P, may be defined as $$512 \times m\text{SFN}_{9+d:5+d} + \text{PCI}_{8:0}$$

where P depends on PCI and the MSBs of mSFN. For example, the control signal, P, may change after the input, X, makes at least one round through mSFN (e.g., the number of m-frames indicated). Additionally, each butterfly (e.g., path from P value to P value) may be controlled by a bit $P_x$ with '0' denoting no permute and '1' denoting permute. For example, for an input of [1 0], and with P=1, the input is permuted, resulting in [0 1]. In another example, for the same input of [1 0], but with P=0, the input is not permuted, meaning that the output is [1 0].

Figure 5:
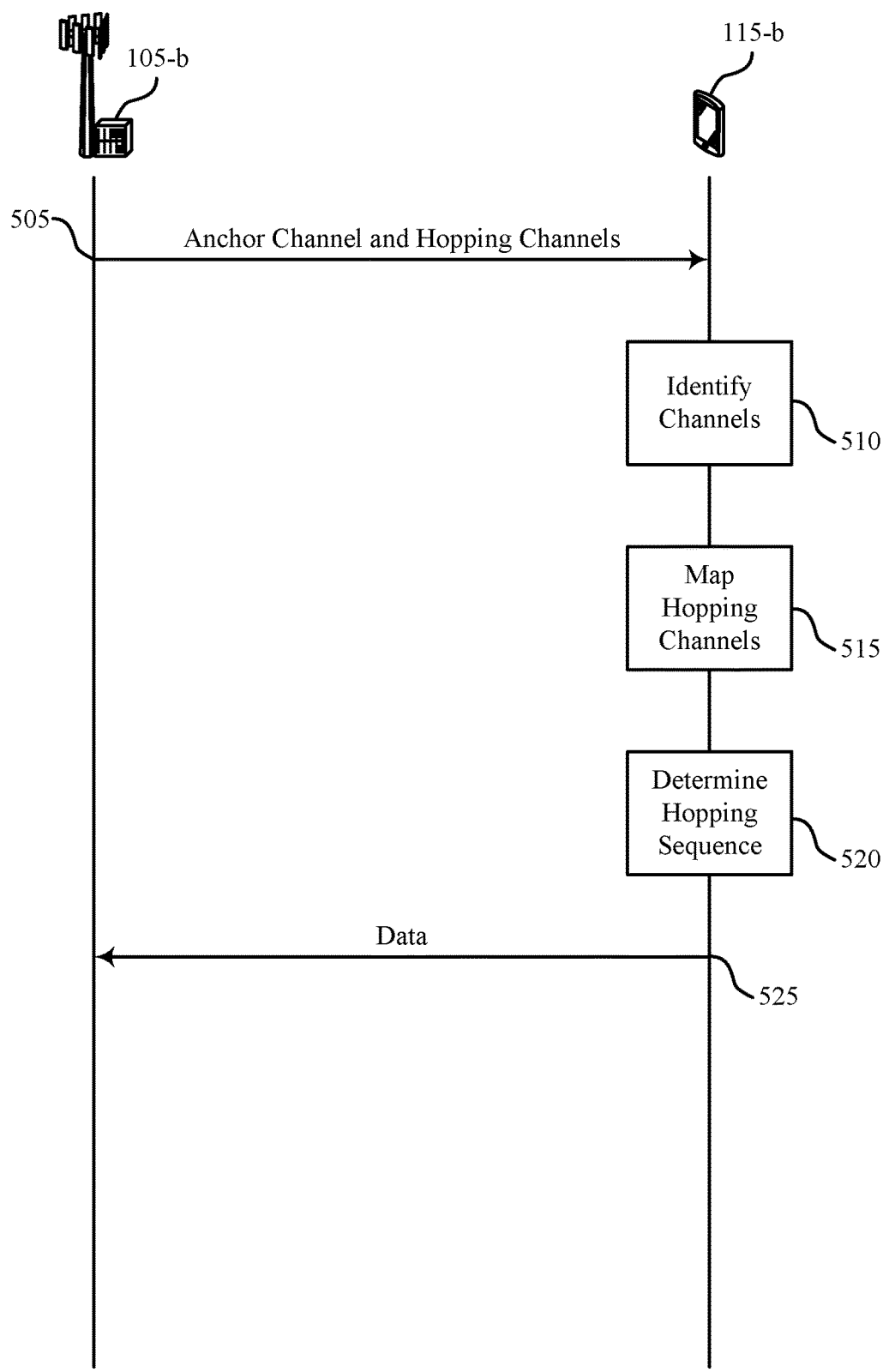
FIG. 5 illustrates an example of a process flow that supports logical channel hopping sequence design in accordance with aspects of the present disclosure.

FIG. 5 illustrates an example of a process flow 500 that supports logical channel hopping sequence design in accordance with various aspects of the present disclosure. In some examples, process flow 500 may implement aspects of wireless communications systems 100 and 200. Process flow 500 illustrates aspects of techniques performed by a base station 105-b and a UE 115-b, which may be examples of a base station 105 and a UE 115 as described with reference to FIGS. 1 through 4.

In the following description of the process flow 500, the operations between the UE 115-b and base station 105-b may be performed in different orders or at different times.

Certain operations may also be left out of the process flow 500, or other operations may be added to the process flow 500. It is to be understood that while a UE 115 is shown performing a number of the operations of process flow 500, any transmitting device (e.g., base station 105-*a*) may perform the operations shown.

At 505, base station 105-*b* may transmit an indication of an anchor channel and a set of physical hopping channels.

At 510, UE 115-*b* may identify the anchor channel for transmission of a synchronization signal and the set of physical hopping channels for transmission of data. In some cases, the synchronization signal may include at least one of a PSS, a SSS, a PBCH, a SIB, or combinations of the same.

At 515, UE 115-*a* may map the set of physical hopping channels to a corresponding set of logical hopping channels.

At 520, UE 115-*b* may determine a hopping sequence to be used for communication of data on the set of logical hopping channels such that every logical channel within the set of logical hopping channels is used an equal number of times within a period of time. In some cases, determining the hopping sequence may include determining a pseudo-random hopping sequence based on a location of UE 115-*b* and a transmission time. Additionally or alternatively, determining the hopping sequence may include determining a pseudo-random hopping sequence based on a PCI associated with UE 115-*b* and a set of subframe numbers (e.g., mSFN) to be used for the communication of the data.

In some cases, determining the hopping sequence may include identifying a number of the set of logical hopping channels and determining a modulo of a pseudo-random number with the number of the set of logical hopping channels. Additionally, UE 115-*b* may determine the pseudo-random number using a pseudo-random number generator whose inputs include portions of bit representations of a PCI associated with the UE 115-*b* and a set of subframe numbers to be used for the communication of the data identifying a number of the set of logical hopping channels, where MSBs of the PCI and least significant bits of the set of subframe numbers are used in determining the pseudo-random number. Additionally or alternatively, UE 115-*b* may determine the pseudo-random number using a permutation function. In some cases, the permutation function may include a permutation five (Perm5) function.

At 525, UE 115-*b* may communicate data on the set of logical hopping channels in accordance with the hopping sequence. For example, as shown with UE 115-*b* performing the actions of process flow 500, UE 115-*b* may receive, from base station 105-*b*, one or more downlink transmissions on the set of hopping channels in accordance with the hopping sequence and may transmit, to base station 105-*b*, one or more uplink transmissions on the set of hopping channels in accordance with the hopping sequence. Alternatively, base station 105-*b* may perform the actions of process flow 500. Accordingly, base station 105-*b* may transmit, to UE 115-*b*, one or more downlink transmissions on the set of hopping channels in accordance with the hopping sequence and may receive, from UE 115-*b*, one or more uplink transmissions on the set of hopping channels in accordance with the hopping sequence. In some cases, the communication of data may be over an unlicensed spectrum.

In one example of the process flow 500, the PCI may be 161 (e.g., PCI=161), 32 m-frames may be indicated and used (e.g., mSFN=0: 31), and the number of hopping frequencies or channels may be 16 (e.g., N=16). An example, corresponding hopping sequence may be then defined, using the process flow 500 and the equations identified above, as [8 10 4 6 12 14 1 3 9 11 5 7 13 15 1 3 9 11 5 7 13 15 0 2 8 10 4 6 12 14 0 2], where each hopping frequency corresponds to a separate logical channel index number (e.g., 0 to 15). Accordingly, the sequence may visit each of the hopping frequencies twice in a time period (e.g., 32 m-frames each lasting 80 ms in eMTC-u) such that the average occupancy time for each hopping frequency is less than the threshold within a time period corresponding to the threshold multiplied by the number of hopping frequencies.

Figure 6:
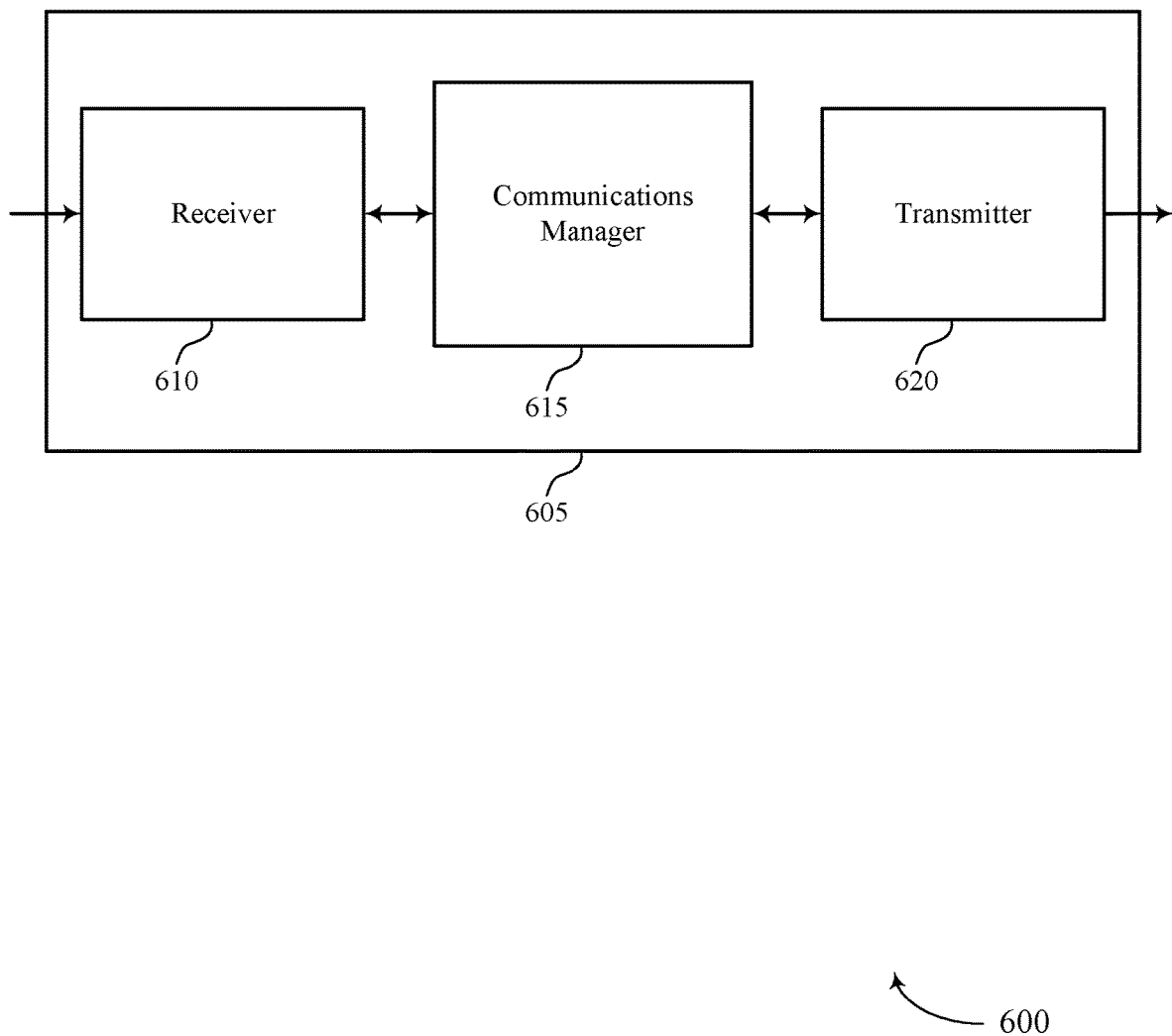
FIGS. 6 through 8 show block diagrams of a device that supports logical channel hopping sequence design in accordance with aspects of the present disclosure.

FIG. 6 shows a block diagram 600 of a wireless device 605 that supports logical channel hopping sequence design in accordance with aspects of the present disclosure. Wireless device 605 may be an example of aspects of a UE 115 or base station 105 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to logical channel hopping sequence design, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 or the communications manager 1015 described with reference to FIGS. 9 and 10.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may identify an anchor channel for transmission of a synchronization signal and a set of physical hopping channels for transmission of data. Additionally, communications manager 615 may map the set of physical hopping channels to a corresponding set of logical hopping channels. In some cases, communications manager 615 may determine a hopping sequence to be used for communication of data on the set of logical hopping channels such that every logical channel within the set of logical hopping channels is used an equal number of times within a period of time. Communications manager 615 may then communicate data on the set of logical hopping channels in accordance with the hopping sequence.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
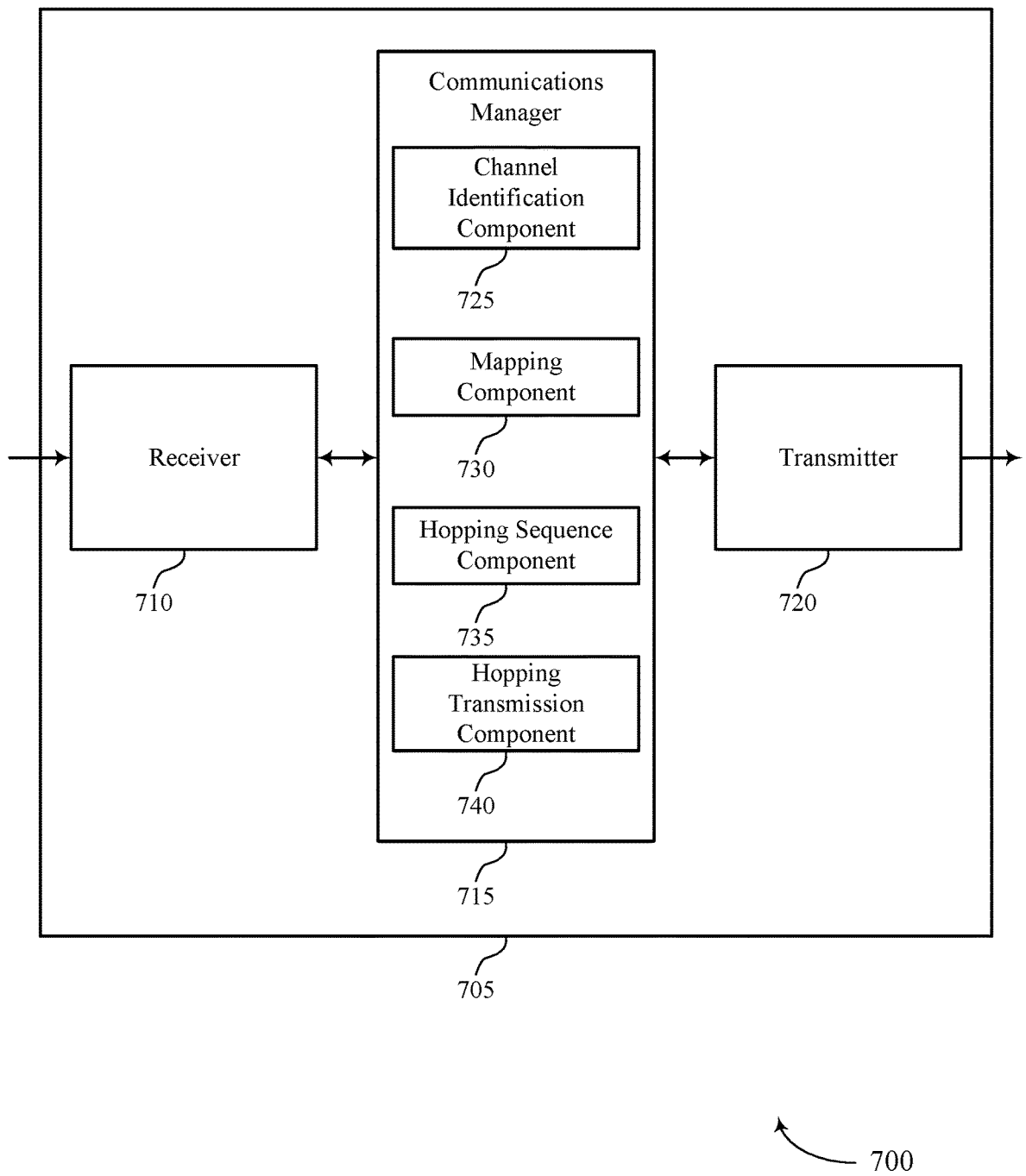

FIG. 7 shows a block diagram 700 of a wireless device 705 that supports logical channel hopping sequence design in accordance with aspects of the present disclosure. Wireless device 705 may be an example of aspects of a wireless device 605 or a UE 115 or base station 105 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to logical channel hopping sequence design, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 or the communications manager 1015 described with reference to FIGS. 9 and 10.

Communications manager 715 may also include channel identification component 725, mapping component 730, hopping sequence component 735, and hopping transmission component 740.

Channel identification component 725 may identify an anchor channel for transmission of a synchronization signal and a set of physical hopping channels for transmission of data. In some cases, the synchronization signal includes at least one of a primary synchronization signal, a second synchronization signal, a physical broadcast channel, a system information block, or combinations of the same.

Mapping component 730 may map the set of physical hopping channels to a corresponding set of logical hopping channels.

Hopping sequence component 735 may determine a hopping sequence to be used for communication of data on the set of logical hopping channels such that every logical channel within the set of logical hopping channels is used an equal number of times within a period of time. In some cases, determining the hopping sequence may include determining a pseudo-random hopping sequence based on a location of the transmitting device and a transmission time. In some cases, determining the hopping sequence may include determining a pseudo-random hopping sequence based on a PCI associated with the transmitting device and a set of subframe numbers to be used for the communication of the data. In some cases, determining the hopping sequence may include identifying a number of the set of logical hopping channels.

Hopping transmission component 740 may communicate data on the set of logical hopping channels in accordance with the hopping sequence. In some cases, the communication of data is over an unlicensed spectrum.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
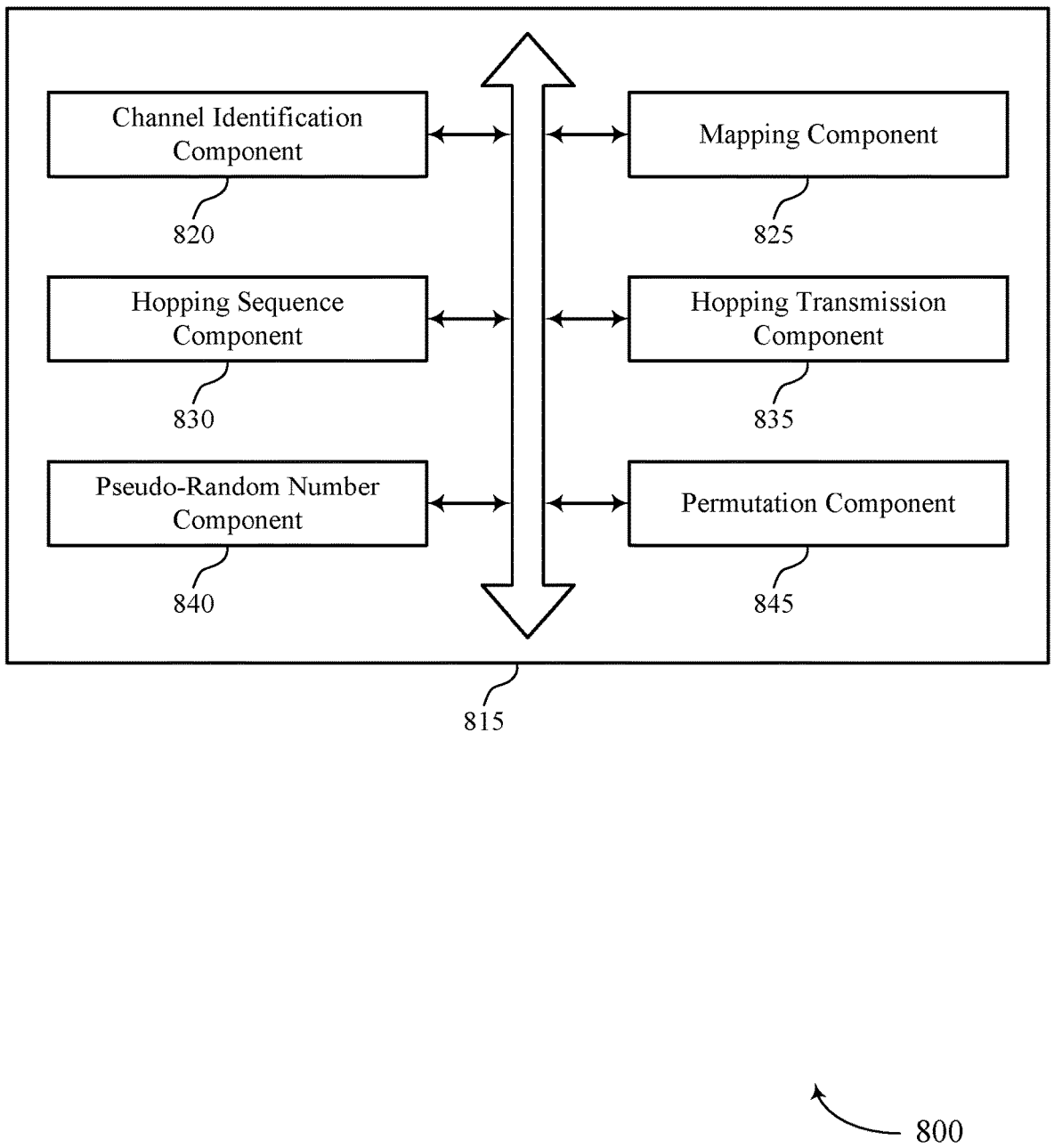

FIG. 8 shows a block diagram 800 of a communications manager 815 that supports logical channel hopping sequence design in accordance with aspects of the present disclosure. The communications manager 815 may be an example of aspects of a communications manager 615, a communications manager 715, a communications manager 915, or a communications manager 1015 described with reference to FIGS. 6, 7, 9, and 10. The communications manager 815 may include channel identification component 820, mapping component 825, hopping sequence component 830, hopping transmission component 835, pseudo-random number component 840, and permutation component 845. Each of these modules may communicate, directly or indirectly, with one another (e.g., via one or more buses).

Channel identification component 820 may identify an anchor channel for transmission of a synchronization signal and a set of physical hopping channels for transmission of data. In some cases, the synchronization signal includes at least one of a primary synchronization signal, a secondary synchronization signal, a physical broadcast channel, a system information block, or combinations of the same.

Mapping component 825 may map the set of physical hopping channels to a corresponding set of logical hopping channels.

Hopping sequence component 830 may determine a hopping sequence to be used for communication of data on the set of logical hopping channels such that every logical channel within the set of logical hopping channels is used an equal number of times within a period of time. In some cases, determining the hopping sequence may include determining a pseudo-random hopping sequence based on a location of the transmitting device and a transmission time. In some cases, determining the hopping sequence may include determining a pseudo-random hopping sequence based on a PCI associated with the transmitting device and a set of subframe numbers to be used for the communication of the data. In some cases, determining the hopping sequence may include identifying a number of the set of logical hopping channels.

Hopping transmission component 835 may communicate data on the set of logical hopping channels in accordance with the hopping sequence. In some cases, the communication of data is over an unlicensed spectrum. In some cases, the wireless device may be a UE. Accordingly, hopping transmission component 835 may receive, from a base station, one or more downlink transmissions on the set of hopping channels in accordance with the hopping sequence, and transmit, to the base station, one or more uplink transmissions on the set of hopping channels in accordance with the hopping sequence. Alternatively, the wireless device may be a base station. Accordingly, hopping transmission component 835 may transmit, to a UE, one or more downlink transmissions on the set of hopping channels in accordance with the hopping sequence, and receive, from the UE, one or more uplink transmissions on the set of hopping channels in accordance with the hopping sequence.

Pseudo-random number component 840 may determine a modulo of a pseudo-random number with the number of the set of logical hopping channels and determine the pseudo-random number using a pseudo-random number generator whose inputs include portions of bit representations of a PCI associated with the transmitting device and a set of subframe numbers to be used for the communication of the data identifying a number of the set of logical hopping channels. In some cases, most significant bits of the PCI and least significant bits of the set of subframe numbers are used in determining the pseudo-random number.

Permutation component 845 may determine the pseudo-random number using a permutation function. In some cases, the permutation function includes a permutation five (Perm5) function.

Figure 9:
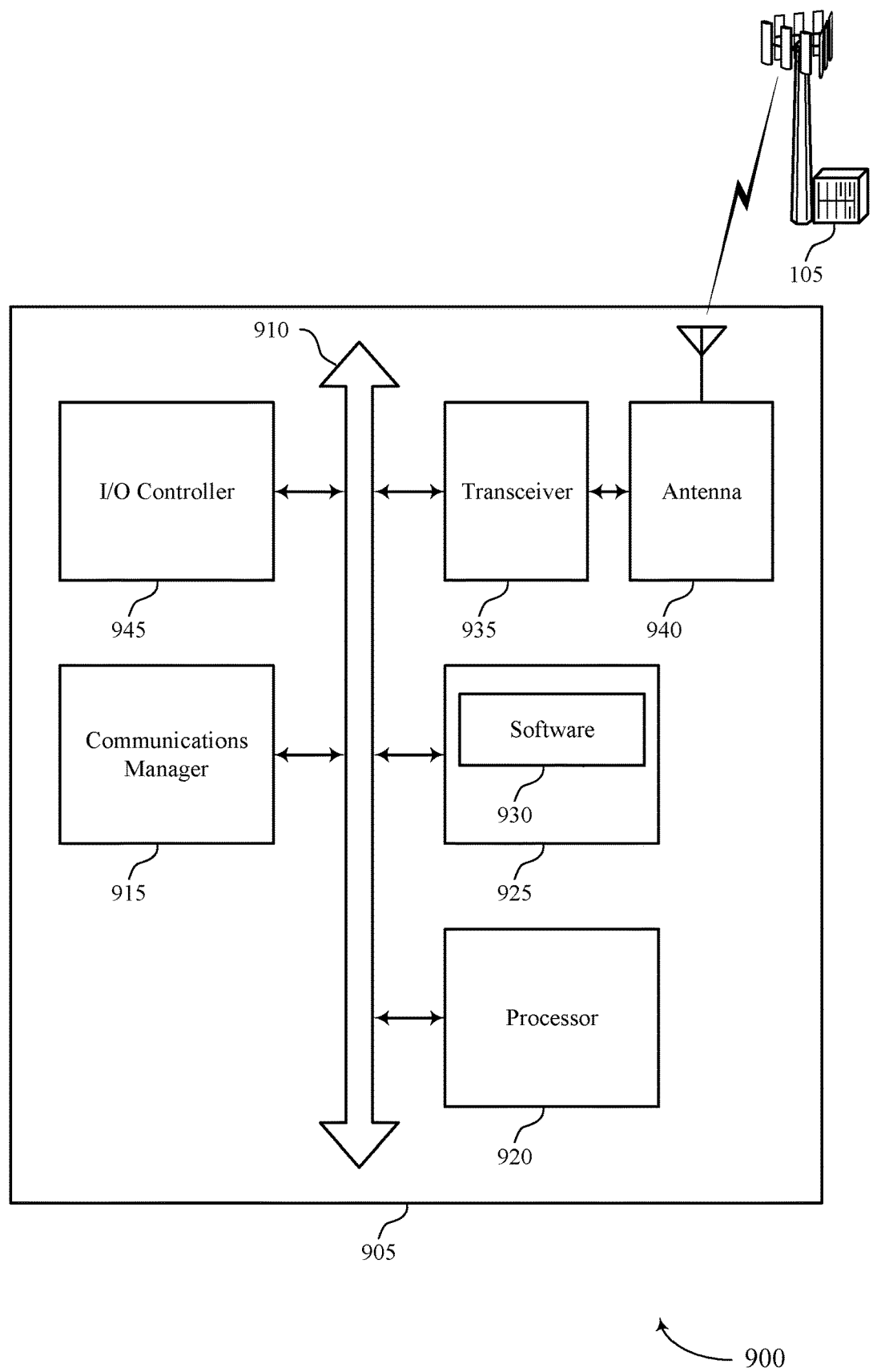
FIG. 9 illustrates a block diagram of a system including a user equipment (UE) that supports logical channel hopping sequence design in accordance with aspects of the present disclosure.

FIG. 9 shows a diagram of a system 900 including a device 905 that supports logical channel hopping sequence design in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, PLD, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting logical channel hopping sequence design).

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support logical channel hopping sequence design. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
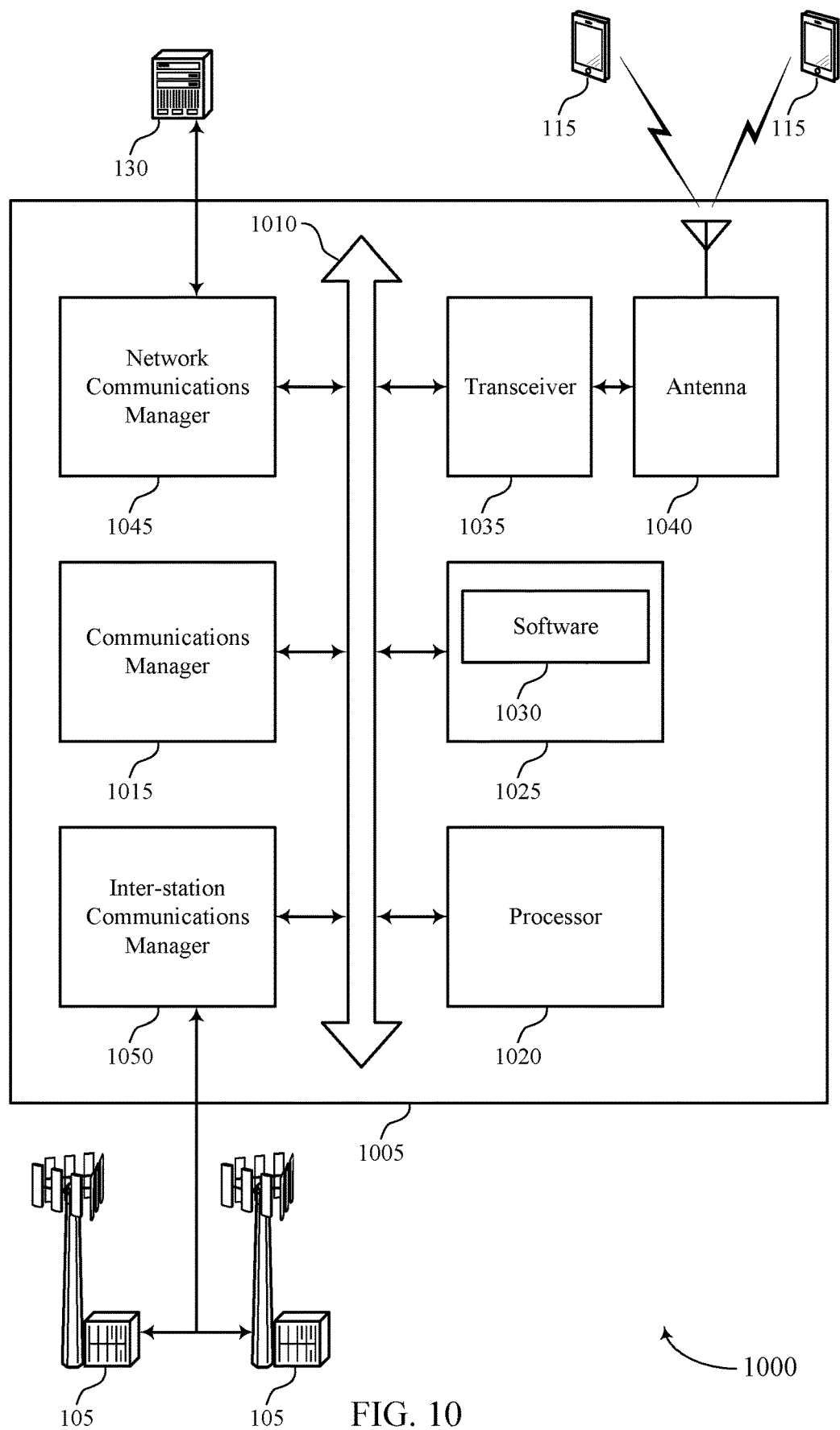
FIG. 10 illustrates a block diagram of a system including a base station that supports logical channel hopping sequence design in accordance with aspects of the present disclosure.

FIG. 10 shows a diagram of a system 1000 including a device 1005 that supports logical channel hopping sequence design in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting logical channel hopping sequence design).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support logical channel hopping sequence design. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105 and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
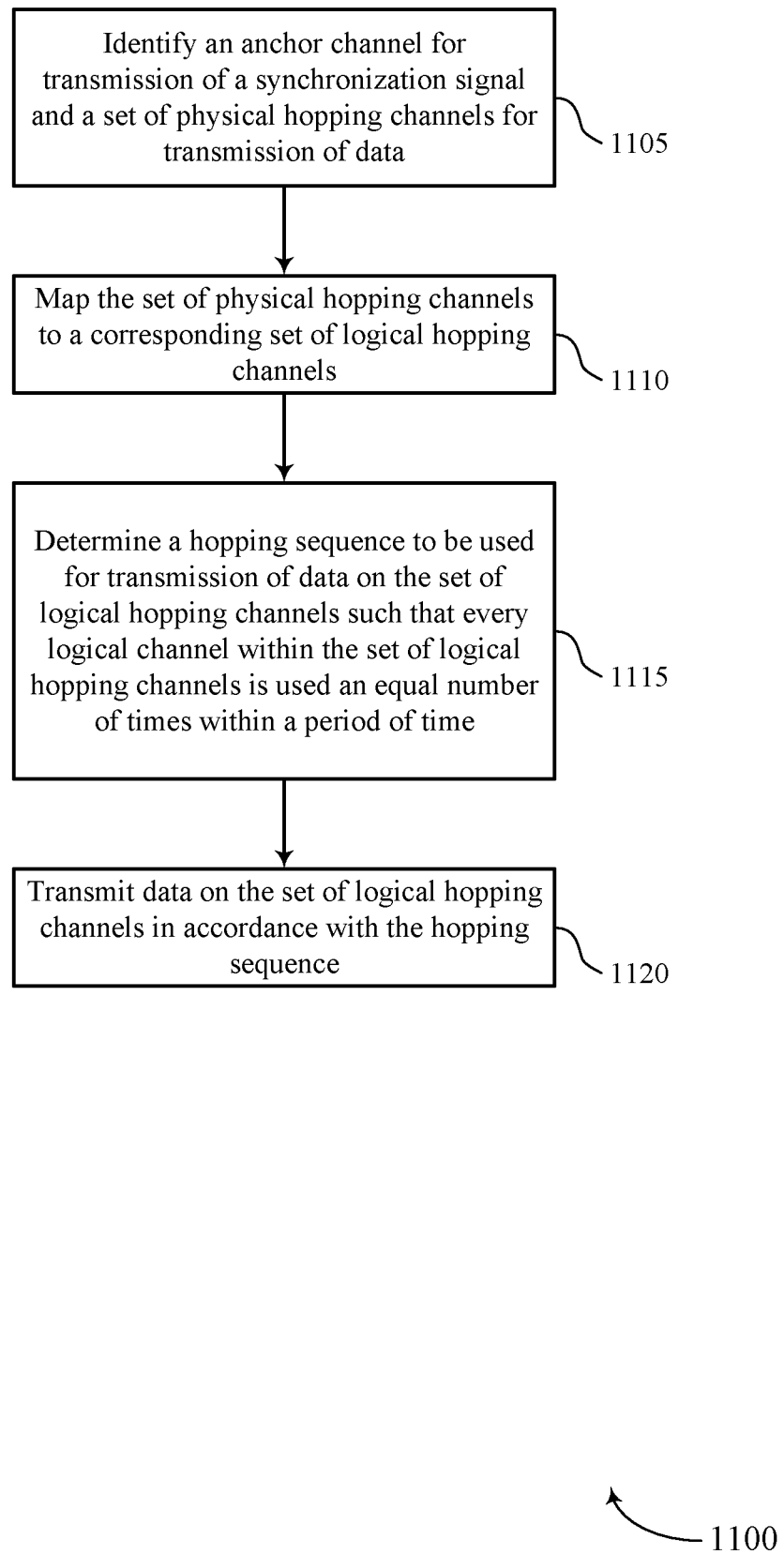
FIGS. 11 through 16 illustrate methods for logical channel hopping sequence design in accordance with aspects of the present disclosure.

FIG. 11 shows a flowchart illustrating a method 1100 for logical channel hopping sequence design in accordance with aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1105, the UE 115 or base station 105 may identify an anchor channel for transmission of a synchronization signal and a set of physical hopping channels for transmission of data. The operations of 1105 may be performed according to the methods described herein. In certain examples, aspects of the operations of 1105 may be performed by a channel identification component as described with reference to FIGS. 6 through 8.

At 1110, the UE 115 or base station 105 may map the set of physical hopping channels to a corresponding set of logical hopping channels. The operations of 1110 may be performed according to the methods described herein. In certain examples, aspects of the operations of 1110 may be performed by a mapping component as described with reference to FIGS. 6 through 8.

At 1115, the UE 115 or base station 105 may determine a hopping sequence to be used for communication of data on the set of logical hopping channels such that every logical channel within the set of logical hopping channels is used an equal number of times within a period of time. The operations of 1115 may be performed according to the methods described herein. In certain examples, aspects of the operations of 1115 may be performed by a hopping sequence component as described with reference to FIGS. 6 through 8.

At 1120, the UE 115 or base station 105 may communicate data on the set of logical hopping channels in accordance with the hopping sequence. The operations of 1120 may be performed according to the methods described herein. In certain examples, aspects of the operations of 1120 may be performed by a hopping transmission component as described with reference to FIGS. 6 through 8.

Figure 12:
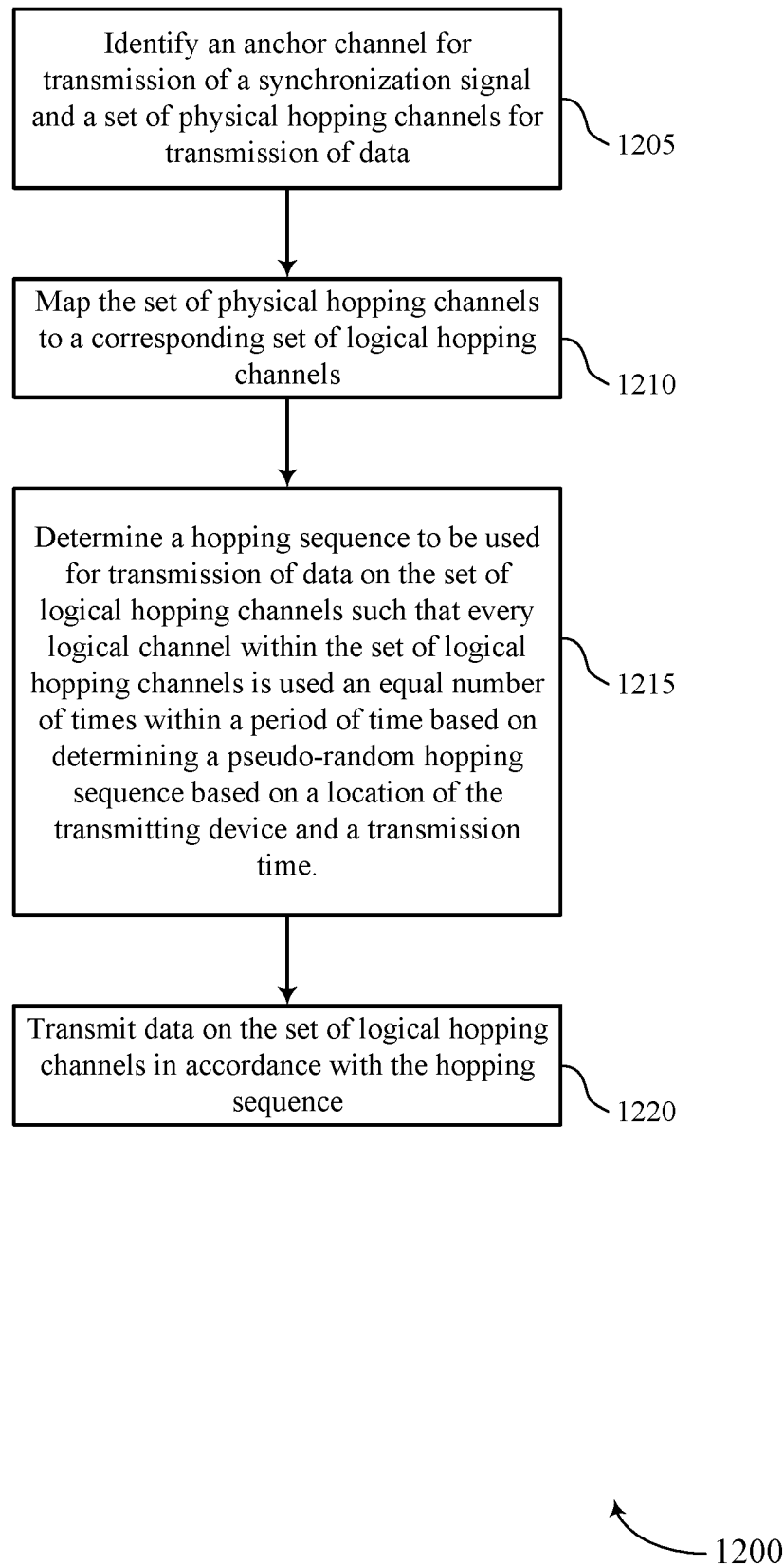

FIG. 12 shows a flowchart illustrating a method 1200 for logical channel hopping sequence design in accordance with aspects of the present disclosure. The operations of method 1200 may be implemented by a UE 115 or base station 105 or its components as described herein. For example, the operations of method 1200 may be performed by a communications manager as described with reference to FIGS. 6 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205, the UE 115 or base station 105 may identify an anchor channel for transmission of a synchronization signal and a set of physical hopping channels for transmission of data. The operations of 1205 may be performed according to the methods described herein. In certain examples, aspects of the operations of 1205 may be performed by a channel identification component as described with reference to FIGS. 6 through 8.

At 1210, the UE 115 or base station 105 may map the set of physical hopping channels to a corresponding set of logical hopping channels. The operations of 1210 may be performed according to the methods described herein. In certain examples, aspects of the operations of 1210 may be performed by a mapping component as described with reference to FIGS. 6 through 8.

At 1215, the UE 115 or base station 105 may determine a hopping sequence to be used for communication of data on the set of logical hopping channels such that every logical channel within the set of logical hopping channels is used an equal number of times within a period of time.

In some cases, determining the hopping sequence may be based on the UE 115 or base station 105 determining a pseudo-random hopping sequence based on a location of the transmitting device and a transmission time. The operations of 1215 may be performed according to the methods described herein. In certain examples, aspects of the operations of 1215 may be performed by a hopping sequence component as described with reference to FIGS. 6 through 8.

At 1220 the UE 115 or base station 105 may communicate data on the set of logical hopping channels in accordance with the hopping sequence. The operations of 1220 may be performed according to the methods described herein. In certain examples, aspects of the operations of 1220 may be performed by a hopping transmission component as described with reference to FIGS. 6 through 8.

Figure 13:
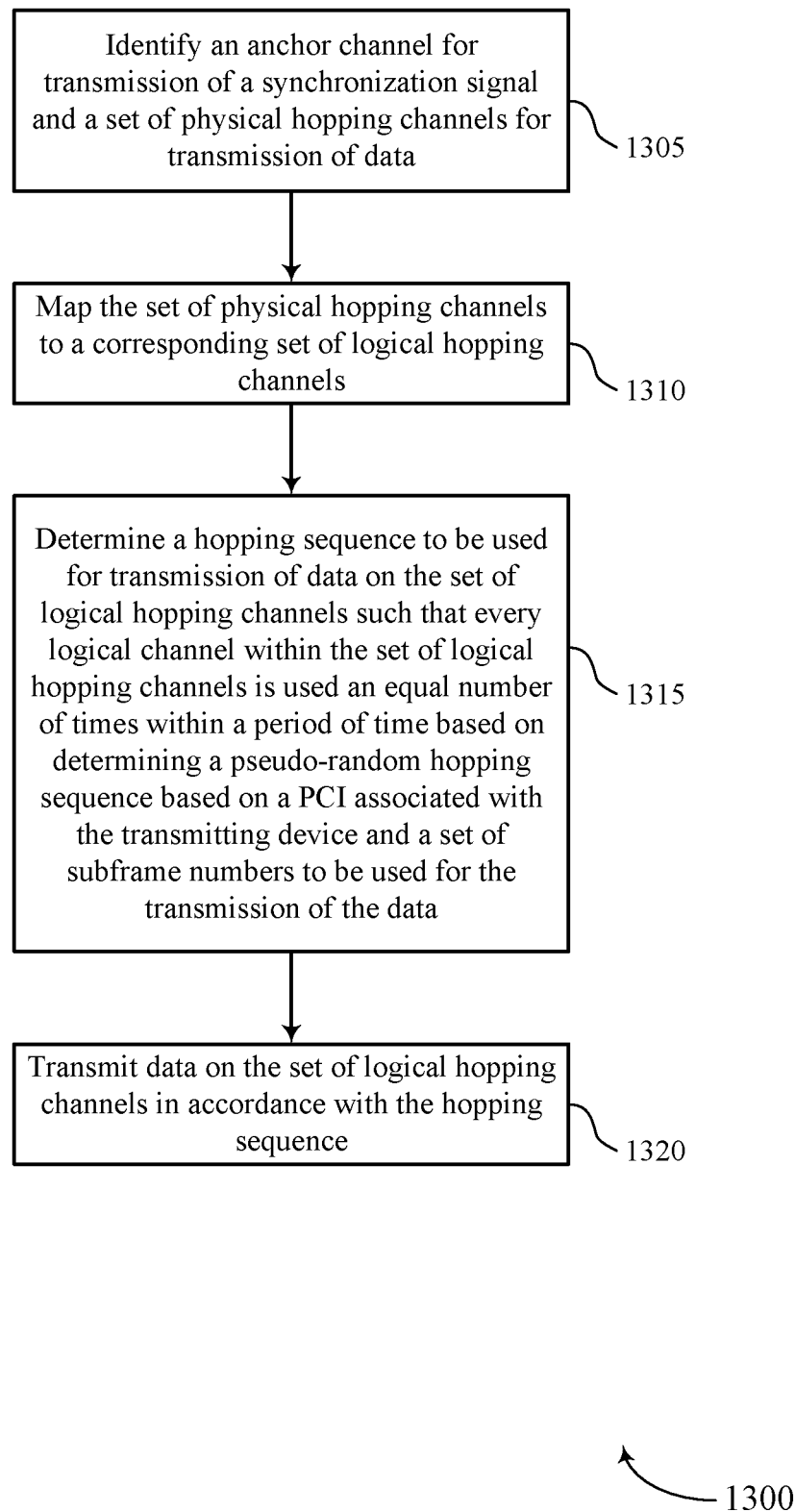

FIG. 13 shows a flowchart illustrating a method 1300 for logical channel hopping sequence design in accordance with aspects of the present disclosure. The operations of method 1300 may be implemented by a UE 115 or base station 105 or its components as described herein. For example, the operations of method 1300 may be performed by a communications manager as described with reference to FIGS. 6 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305, the UE 115 or base station 105 may identify an anchor channel for transmission of a synchronization signal and a set of physical hopping channels for transmission of data. The operations of 1305 may be performed according to the methods described herein. In certain examples, aspects of the operations of 1305 may be performed by a channel identification component as described with reference to FIGS. 6 through 8.

At 1310, the UE 115 or base station 105 may map the set of physical hopping channels to a corresponding set of logical hopping channels. The operations of 1310 may be performed according to the methods described herein. In certain examples, aspects of the operations of 1310 may be performed by a mapping component as described with reference to FIGS. 6 through 8.

At 1315, the UE 115 or base station 105 may determine a hopping sequence to be used for communication of data on the set of logical hopping channels such that every logical channel within the set of logical hopping channels is used an equal number of times within a period of time.

In some cases, determining the hopping sequence may be based on the UE 115 or base station 105 determining a pseudo-random hopping sequence based on a PCI associated with the transmitting device and a set of subframe numbers to be used for the communication of the data. The operations of 1315 may be performed according to the methods described herein. In certain examples, aspects of the operations of 1315 may be performed by a hopping sequence component as described with reference to FIGS. 6 through 8.

At 1320, the UE 115 or base station 105 may communicate data on the set of logical hopping channels in accordance with the hopping sequence. The operations of 1320 may be performed according to the methods described herein. In certain examples, aspects of the operations of 1320 may be performed by a hopping transmission component as described with reference to FIGS. 6 through 8.

Figure 14:
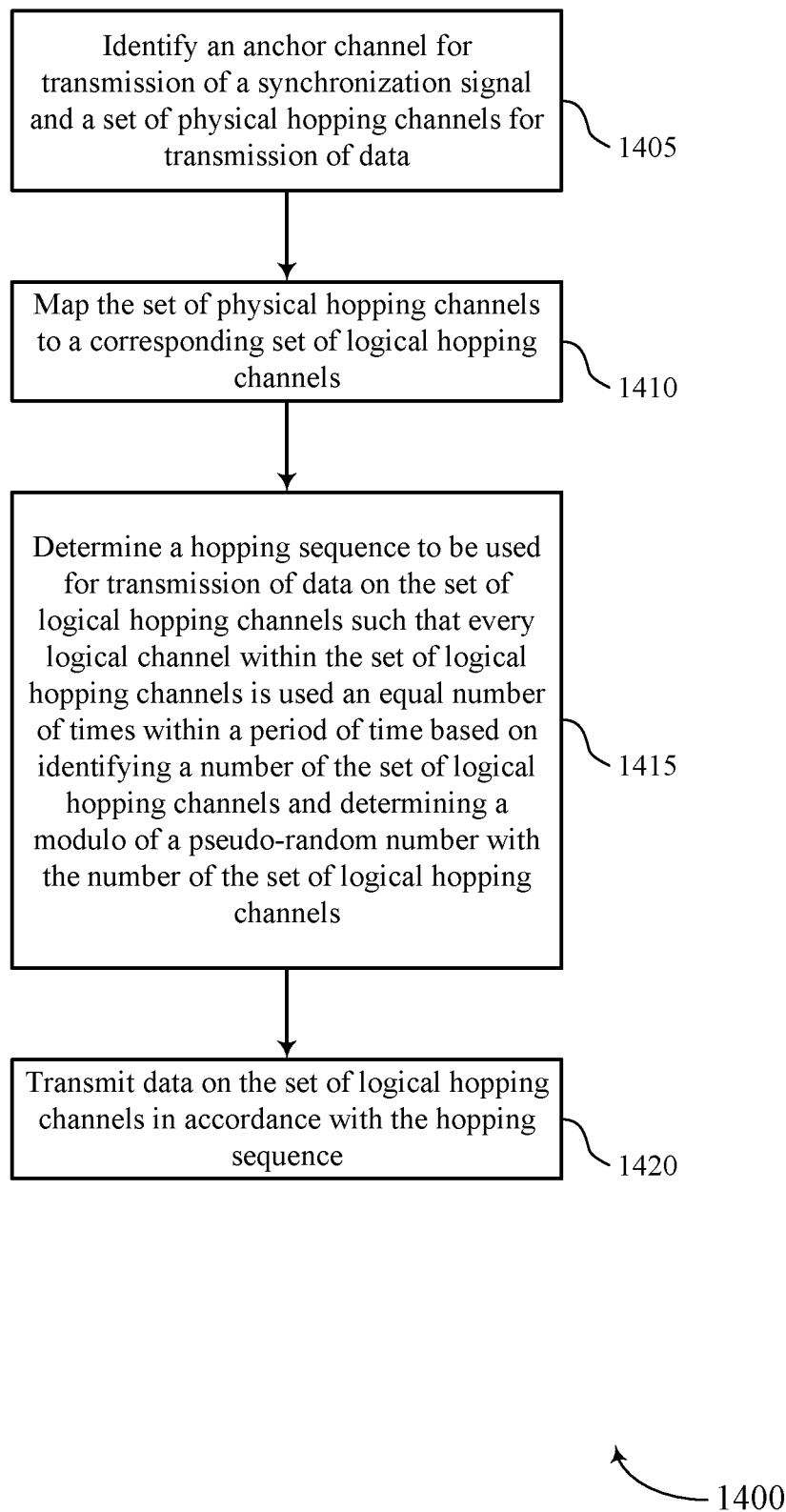

FIG. 14 shows a flowchart illustrating a method 1400 for logical channel hopping sequence design in accordance with aspects of the present disclosure. The operations of method 1400 may be implemented by a UE 115 or base station 105 or its components as described herein. For example, the operations of method 1400 may be performed by a communications manager as described with reference to FIGS. 6 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1405, the UE 115 or base station 105 may identify an anchor channel for transmission of a synchronization signal and a set of physical hopping channels for transmission of data. The operations of 1405 may be performed according to the methods described herein. In certain examples, aspects of the operations of 1405 may be performed by a channel identification component as described with reference to FIGS. 6 through 8.

At 1410, the UE 115 or base station 105 may map the set of physical hopping channels to a corresponding set of logical hopping channels. The operations of 1410 may be performed according to the methods described herein. In certain examples, aspects of the operations of 1410 may be performed by a mapping component as described with reference to FIGS. 6 through 8.

At 1415, the UE 115 or base station 105 may determine a hopping sequence to be used for communication of data on the set of logical hopping channels such that every logical channel within the set of logical hopping channels is used an equal number of times within a period of time.

In some cases, determining the hopping sequence may be based on the UE 115 or base station 105 identifying a number of the set of logical hopping channels. The operations of 1415 may be performed according to the methods described herein. In certain examples, aspects of the operations of 1415 may be performed by a hopping sequence component as described with reference to FIGS. 6 through 8.

Additionally, the UE 115 or base station 105 may determine a modulo of a pseudo-random number with the number of the set of logical hopping channels. These operations may be performed according to the methods described herein. In certain examples, aspects of these operations may be performed by a pseudo-random number component as described with reference to FIGS. 6 through 8.

At 1420, the UE 115 or base station 105 may communicate data on the set of logical hopping channels in accordance with the hopping sequence. The operations of 1420 may be performed according to the methods described herein. In certain examples, aspects of the operations of 1420 may be performed by a hopping transmission component as described with reference to FIGS. 6 through 8.

Figure 15:
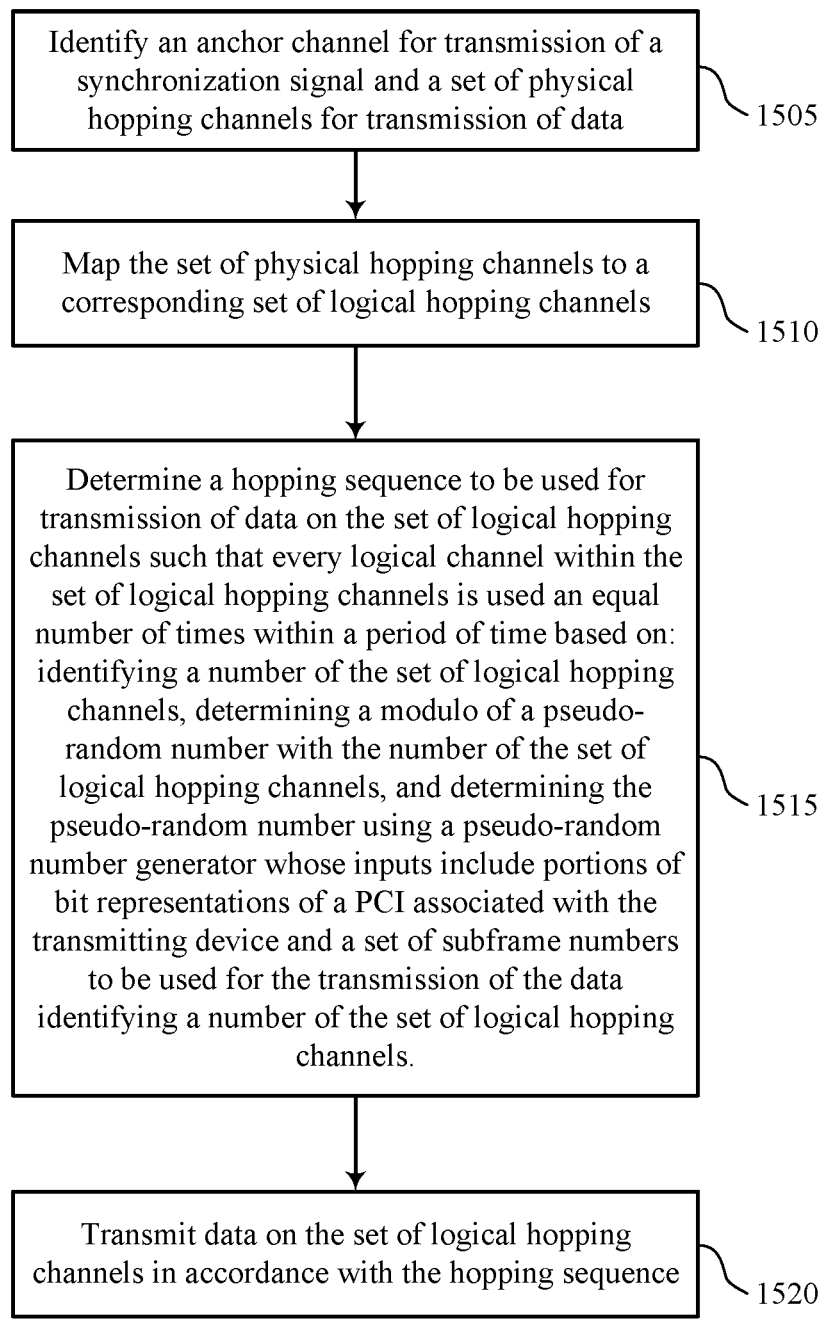

FIG. 15 shows a flowchart illustrating a method 1500 for logical channel hopping sequence design in accordance with aspects of the present disclosure. The operations of method 1500 may be implemented by a UE 115 or base station 105 or its components as described herein. For example, the operations of method 1500 may be performed by a communications manager as described with reference to FIGS. 6 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1505, the UE 115 or base station 105 may identify an anchor channel for transmission of a synchronization signal and a set of physical hopping channels for transmission of data. The operations of 1505 may be performed according to the methods described herein. In certain examples, aspects of the operations of 1505 may be performed by a channel identification component as described with reference to FIGS. 6 through 8.

At 1510, the UE 115 or base station 105 may map the set of physical hopping channels to a corresponding set of logical hopping channels. The operations of 1510 may be performed according to the methods described herein. In certain examples, aspects of the operations of 1510 may be performed by a mapping component as described with reference to FIGS. 6 through 8.

At 1515, the UE 115 or base station 105 may determine a hopping sequence to be used for communication of data on the set of logical hopping channels such that every logical channel within the set of logical hopping channels is used an equal number of times within a period of time.

In some cases, determining the hopping sequence may be based on the UE 115 or base station 105 identifying a number of the set of logical hopping channels. The operations of 1515 may be performed according to the methods described herein. In certain examples, aspects of the operations of 1515 may be performed by a hopping sequence component as described with reference to FIGS. 6 through 8.

Additionally, the UE 115 or base station 105 may determine a modulo of a pseudo-random number with the number of the set of logical hopping channels. These operations may be performed according to the methods described herein. In certain examples, aspects of these operations may be performed by a pseudo-random number component as described with reference to FIGS. 6 through 8.

Additionally, the UE 115 or base station 105 may determine the pseudo-random number using a pseudo-random number generator whose inputs include portions of bit representations of a PCI associated with the transmitting device and a set of subframe numbers to be used for the communication of the data identifying a number of the set of logical hopping channels. These operations may be performed according to the methods described herein. In certain examples, aspects of these operations may be performed by a pseudo-random number component as described with reference to FIGS. 6 through 8.

At 1520, the UE 115 or base station 105 may communicate data on the set of logical hopping channels in accordance with the hopping sequence. The operations of 1520 may be performed according to the methods described herein. In certain examples, aspects of the operations of 1520 may be performed by a hopping transmission component as described with reference to FIGS. 6 through 8.

Figure 16:
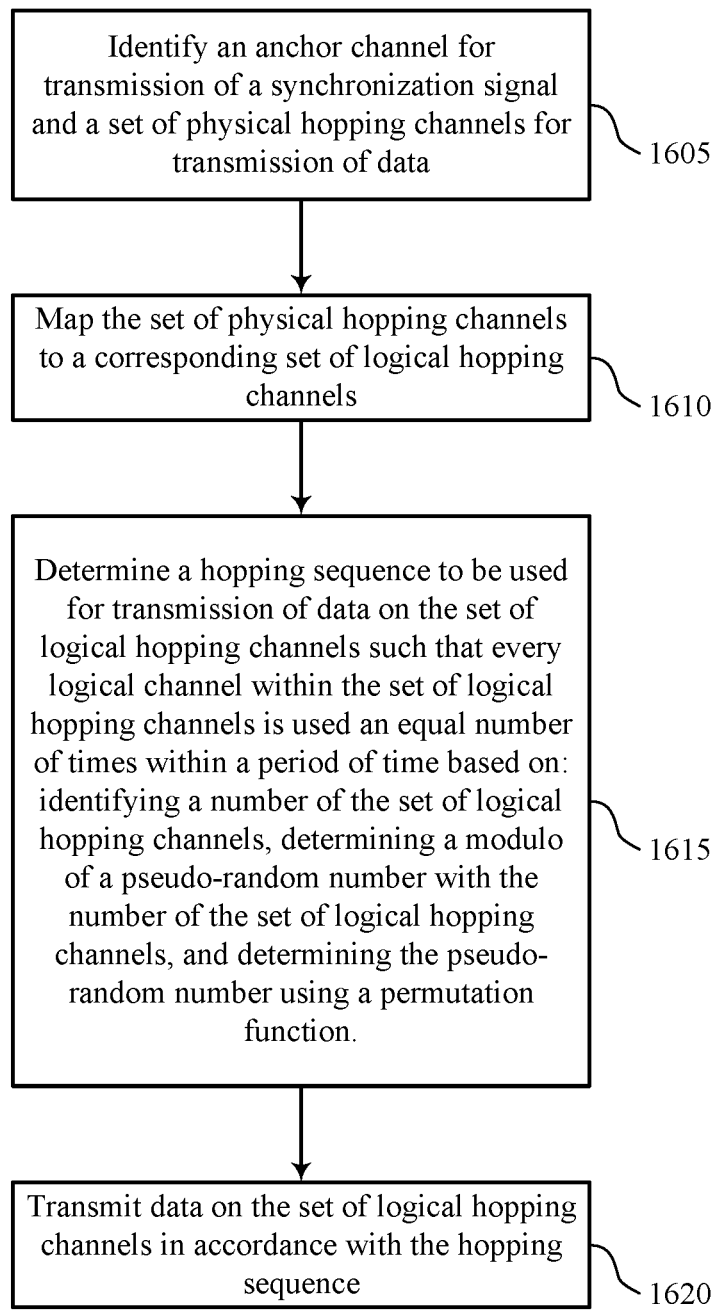

FIG. 16 shows a flowchart illustrating a method 1600 for logical channel hopping sequence design in accordance with aspects of the present disclosure. The operations of method 1600 may be implemented by a UE 115 or base station 105 or its components as described herein. For example, the operations of method 1600 may be performed by a communications manager as described with reference to FIGS. 6 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1605, the UE 115 or base station 105 may identify an anchor channel for transmission of a synchronization signal and a set of physical hopping channels for transmission of data. The operations of 1605 may be performed according to the methods described herein. In certain examples, aspects of the operations of 1605 may be performed by a channel identification component as described with reference to FIGS. 6 through 8.

At 1610, the UE 115 or base station 105 may map the set of physical hopping channels to a corresponding set of logical hopping channels. The operations of 1610 may be performed according to the methods described herein. In certain examples, aspects of the operations of 1610 may be performed by a mapping component as described with reference to FIGS. 6 through 8.

At 1615, the UE 115 or base station 105 may determine a hopping sequence to be used for communication of data on the set of logical hopping channels such that every logical channel within the set of logical hopping channels is used an equal number of times within a period of time.

In some cases, determining the hopping sequence may be based on the UE 115 or base station 105 identifying a number of the set of logical hopping channels. The operations of 1615 may be performed according to the methods described herein. In certain examples, aspects of the operations of 1615 may be performed by a hopping sequence component as described with reference to FIGS. 6 through 8.

Additionally, the UE 115 or base station 105 may determine a modulo of a pseudo-random number with the number of the set of logical hopping channels. These operations may be performed according to the methods described herein. In certain examples, aspects of these operations of 1625 may be performed by a pseudo-random number component as described with reference to FIGS. 6 through 8.

Additionally, the UE 115 or base station 105 may determine the pseudo-random number using a permutation function. These operations may be performed according to the methods described herein. In certain examples, aspects of these operations of may be performed by a permutation component as described with reference to FIGS. 6 through 8.

At 1620 the UE 115 or base station 105 may communicate data on the set of logical hopping channels in accordance with the hopping sequence. The operations of 1620 may be performed according to the methods described herein. In certain examples, aspects of the operations of 1620 may be performed by a hopping transmission component as described with reference to FIGS. 6 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless device, comprising:

identifying an anchor channel for transmission of a synchronization signal and a plurality of physical hopping channels for transmission of data;

mapping each physical hopping channel of the plurality of physical hopping channels to a corresponding logical hopping channel of a plurality of logical hopping channels;

determining a hopping sequence to be used for communication of data on the plurality of logical hopping channels such that every logical channel within the plurality of logical hopping channels is used an equal number of times within a period of time; and communicating data on the plurality of logical hopping channels in accordance with the hopping sequence.

2. The method of claim 1, further comprising:
determining a pseudo-random hopping sequence based at least in part on a physical cell identifier (PCI) associated with the wireless device and a plurality of subframe numbers to be used for the communication of the data, wherein each physical hopping channel of the plurality of physical hopping channels is mapped to a corresponding logical hopping channel of the plurality of logical hopping channels based at least in part on the pseudo-random hopping sequence.

3. The method of claim 1, further comprising:
identifying a number of the plurality of logical hopping channels; and
determining a modulo of a pseudo-random number with the number of the plurality of logical hopping channels, wherein each physical hopping channel of the plurality of physical hopping channels is mapped to a corresponding logical hopping channel of the plurality of logical hopping channels based at least in part on the modulo of the pseudo-random number.

4. The method of claim 3, further comprising:
determining the pseudo-random number using a pseudo-random number generator whose inputs include portions of bit representations of a PCI associated with the wireless device and a plurality of subframe numbers to be used for the communication of the data identifying a number of the plurality of logical hopping channels.

5. The method of claim 4, wherein most significant bits of the PCI and least significant bits of the plurality of subframe numbers are used in determining the pseudo-random number.

6. The method of claim 3, further comprising:
determining the pseudo-random number using a permutation function.

7. The method of claim 6, wherein the permutation function comprises a permutation five function.

8. The method of claim 1, wherein the synchronization signal includes at least one of a primary synchronization signal, a secondary synchronization signal, a physical broadcast channel, a system information block.

9. The method of claim 1, wherein the communication of data is over an unlicensed spectrum.

10. The method of claim 1, wherein the wireless device comprises a user equipment (UE), and wherein communicating data on the plurality of logical hopping channels in accordance with the hopping sequence further comprises:
receiving, from a base station, one or more downlink transmissions on the plurality of logical hopping channels in accordance with the hopping sequence; and
transmitting, to the base station, one or more uplink transmissions on the plurality of logical hopping channels in accordance with the hopping sequence.

11. The method of claim 1, wherein the wireless device comprises a base station, and wherein communicating data on the plurality of logical hopping channels in accordance with the hopping sequence further comprises:
transmitting, to a user equipment (UE), one or more downlink transmissions on the plurality of logical hopping channels in accordance with the hopping sequence; and
receiving, from the UE, one or more uplink transmissions on the plurality of logical hopping channels in accordance with the hopping sequence.

12. An apparatus for wireless communication, comprising:
a processor;
memory in electronic communication with the processor; and
instructions stored in the memory, wherein the instructions are executable by the processor to:
identify an anchor channel for transmission of a synchronization signal and a plurality of physical hopping channels for transmission of data;
map each physical hopping channel of the plurality of physical hopping channels to a corresponding logical hopping channel of a plurality of logical hopping channels;
determine a hopping sequence to be used for communication of data on the plurality of logical hopping channels such that every logical channel within the plurality of logical hopping channels is used an equal number of times within a period of time; and
communicate data on the plurality of logical hopping channels in accordance with the hopping sequence.

13. The apparatus of claim 12, wherein the instructions executable by the processor further comprise instructions executable by the processor to:
determine a pseudo-random hopping sequence based at least in part on a physical cell identifier (PCI) associated with the apparatus and a plurality of subframe numbers to be used for the communication of the data, wherein each physical hopping channel of the plurality of physical hopping channels is mapped to a corresponding logical hopping channel of the plurality of logical hopping channels based at least in part on the pseudo-random hopping sequence.

14. The apparatus of claim 12, wherein the instructions executable by the processor further comprise instructions executable by the processor to:
identify a number of the plurality of logical hopping channels; and
determine a modulo of a pseudo-random number with the number of the plurality of logical hopping channels, wherein each physical hopping channel of the plurality of physical hopping channels is mapped to a corresponding logical hopping channel of the plurality of logical hopping channels based at least in part on the modulo of the pseudo-random number.

15. The apparatus of claim 14, wherein the instructions executable by the processor further comprise instructions executable by the processor to:
determine the pseudo-random number using a pseudo-random number generator whose inputs include portions of bit representations of a PCI associated with the apparatus and a plurality of subframe numbers to be used for the communication of the data identifying a number of the plurality of logical hopping channels.

16. The apparatus of claim 15, wherein most significant bits of the PCI and least significant bits of the plurality of subframe numbers are used in determining the pseudo-random number.

17. The apparatus of claim 14, wherein the instructions executable by the processor further comprise instructions executable by the processor to:
determine the pseudo-random number using a permutation function.

18. The apparatus of claim 17, wherein the permutation function comprises a permutation five function.

19. The apparatus of claim 12, wherein the synchronization signal includes at least one of a primary synchronization signal, a secondary synchronization signal, a physical broadcast channel, a system information block.

20. The apparatus of claim 12, wherein the communication of data is over an unlicensed spectrum.

21. The apparatus of claim 12, wherein the apparatus comprises a user equipment (UE), and wherein the instructions executable by the processor to communicate data on the plurality of logical hopping channels in accordance with the hopping sequence comprise instructions executable by the processor to:
receive, from a base station, one or more downlink transmissions on the plurality of logical hopping channels in accordance with the hopping sequence; and
transmit, to the base station, one or more uplink transmissions on the plurality of logical hopping channels in accordance with the hopping sequence.

22. The apparatus of claim 12, wherein the apparatus comprises a base station, and wherein the instructions executable by the processor to communicate data on the plurality of logical hopping channels in accordance with the hopping sequence comprise instructions executable by the processor to:
transmit, to a user equipment (UE), one or more downlink transmissions on the plurality of logical hopping channels in accordance with the hopping sequence; and
receive, from the UE, one or more uplink transmissions on the plurality of logical hopping channels in accordance with the hopping sequence.

23. An apparatus for wireless communication, comprising:
means for identifying an anchor channel for transmission of a synchronization signal and a plurality of physical hopping channels for transmission of data;
means for mapping each physical hopping channel of the plurality of physical hopping channels to a corresponding logical hopping channel of a plurality of logical hopping channels;
means for determining a hopping sequence to be used for communication of data on the plurality of logical hopping channels such that every logical channel within the plurality of logical hopping channels is used an equal number of times within a period of time; and
means for communicating data on the plurality of logical hopping channels in accordance with the hopping sequence.

24. The apparatus of claim 23, further comprising:
means for determining a pseudo-random hopping sequence based at least in part on a physical cell identifier (PCI) associated with the apparatus and a plurality of subframe numbers to be used for the communication of the data, wherein each physical hopping channel of the plurality of physical hopping channels is mapped to a corresponding logical hopping channel of the plurality of logical hopping channels based at least in part on the pseudo-random hopping sequence.

25. The apparatus of claim 23, further comprising:
means for identifying a number of the plurality of logical hopping channels; and
means for determining a modulo of a pseudo-random number with the number of the plurality of logical hopping channels, wherein each physical hopping channel of the plurality of physical hopping channels is mapped to a corresponding logical hopping channel of the plurality of logical hopping channels based at least in part on the modulo of the pseudo-random number.

26. The apparatus of claim 25, further comprising:
means for determining the pseudo-random number using a pseudo-random number generator whose inputs include portions of bit representations of a PCI associated with the apparatus and a plurality of subframe numbers to be used for the communication of the data identifying a number of the plurality of logical hopping channels.

27. The apparatus of claim 26, wherein most significant bits of the PCI and least significant bits of the plurality of subframe numbers are used in determining the pseudo-random number.

28. The apparatus of claim 25, further comprising:
means for determining the pseudo-random number using a permutation function.

29. The apparatus of claim 28, wherein the permutation function comprises a permutation five function.

30. The apparatus of claim 23, wherein the synchronization signal includes at least one of a primary synchronization signal, a secondary synchronization signal, a physical broadcast channel, a system information block.

31. The apparatus of claim 23, wherein the communication of data is over an unlicensed spectrum.

32. The apparatus of claim 23, wherein the apparatus comprises a user equipment (UE), and wherein the means for communicating data on the plurality of logical hopping channels in accordance with the hopping sequence further comprises:
means for receiving, from a base station, one or more downlink transmissions on the plurality of logical hopping channels in accordance with the hopping sequence; and
means for transmitting, to the base station, one or more uplink transmissions on the plurality of logical hopping channels in accordance with the hopping sequence.

33. The apparatus of claim 23, wherein the apparatus comprises a base station, and wherein the means for communicating data on the plurality of logical hopping channels in accordance with the hopping sequence further comprises:
means for transmitting, to a user equipment (UE), one or more downlink transmissions on the plurality of logical hopping channels in accordance with the hopping sequence; and
means for receiving, from the UE, one or more uplink transmissions on the plurality of logical hopping channels in accordance with the hopping sequence.

34. A non-transitory computer-readable medium storing code for wireless communication at a wireless device, the code comprising instructions executable to:
identify an anchor channel for transmission of a synchronization signal and a plurality of physical hopping channels for transmission of data;

map each physical hopping channel of the plurality of physical hopping channels to a corresponding logical hopping channel of a plurality of logical hopping channels;

determine a hopping sequence to be used for communication of data on the plurality of logical hopping channels such that every logical channel within the plurality of logical hopping channels is used an equal number of times within a period of time; and communicate data on the plurality of logical hopping channels in accordance with the hopping sequence.

35. The non-transitory computer-readable medium of claim 34, wherein the instructions are further executable to:
determine a pseudo-random hopping sequence based at least in part on a physical cell identifier (PCI) associated with the wireless device and a plurality of subframe numbers to be used for the communication of the data, wherein each physical hopping channel of the plurality of physical hopping channels is mapped to a corresponding logical hopping channel of the plurality of logical hopping channels based at least in part on the pseudo-random hopping sequence.

36. The non-transitory computer-readable medium of claim 34, wherein the instructions are further executable to:
identify a number of the plurality of logical hopping channels; and
determine a modulo of a pseudo-random number with the number of the plurality of logical hopping channels, wherein each physical hopping channel of the plurality of physical hopping channels is mapped to a corresponding logical hopping channel of the plurality of logical hopping channels based at least in part on the modulo of the pseudo-random number.

37. The non-transitory computer-readable medium of claim 36, wherein the instructions are further executable to:
determine the pseudo-random number using a pseudo-random number generator whose inputs include portions of bit representations of a PCI associated with the wireless device and a plurality of subframe numbers to be used for the communication of the data identifying a number of the plurality of logical hopping channels.

38. The non-transitory computer-readable medium of claim 37, wherein most significant bits of the PCI and least significant bits of the plurality of subframe numbers are used in determining the pseudo-random number.

39. The non-transitory computer-readable medium of claim 36, wherein the instructions are further executable to:
determine the pseudo-random number using a permutation function.

40. The non-transitory computer-readable medium of claim 39, wherein the permutation function comprises a permutation five function.

41. The non-transitory computer-readable medium of claim 34, wherein the synchronization signal includes at least one of a primary synchronization signal, a secondary synchronization signal, a physical broadcast channel, a system information block.

42. The non-transitory computer-readable medium of claim 34, wherein the communication of data is over an unlicensed spectrum.

43. The non-transitory computer-readable medium of claim 34, wherein the wireless device comprises a user equipment (UE), and wherein the instructions to communicate data on the plurality of logical hopping channels in accordance with the hopping sequence are executable to:
receive, from a base station, one or more downlink transmissions on the plurality of logical hopping channels in accordance with the hopping sequence; and
transmit, to the base station, one or more uplink transmissions on the plurality of logical hopping channels in accordance with the hopping sequence.

44. The non-transitory computer-readable medium of claim 34, wherein the wireless device comprises a base station, and wherein the instructions to communicate data on the plurality of logical hopping channels in accordance with the hopping sequence are executable to:
transmit, to a user equipment (UE), one or more downlink transmissions on the plurality of logical hopping channels in accordance with the hopping sequence; and
receive, from the UE, one or more uplink transmissions on the plurality of logical hopping channels in accordance with the hopping sequence.

* * * * *